US007571356B2

(12) United States Patent  
Inoue et al.

(10) Patent No.: US 7,571,356 B2  
(45) Date of Patent: Aug. 4, 2009

(54) STORAGE CONTROL DEVICE, AND ERROR INFORMATION MANAGEMENT METHOD FOR STORAGE CONTROL DEVICE

(75) Inventors: Tetsuya Inoue, Odawara (JP); Hiroshi Suzuki, Sagamihara (JP); Hiromi Matsuhige, Hiratsuka (JP); Masato Ogawa, Chigasaki (JP); Tomokazu Yokoyama, Fujisawa (JP); Masateru Kurokawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 525 days.

(21) Appl. No.: 11/334,629

(22) Filed: Jan. 19, 2006

(65) Prior Publication Data

US 2007/0174719 A1 Jul. 26, 2007

(30) Foreign Application Priority Data

Nov. 22, 2005 (JP) ............................. 2005-337836

(51) Int. Cl.
*G06F 11/00* (2006.01)
(52) U.S. Cl. ........................................... 714/42; 714/6
(58) Field of Classification Search ................ 714/5, 714/6, 7, 42
See application file for complete search history.

(56) References Cited

U.S. PATENT DOCUMENTS

| 5,274,645 | A | * | 12/1993 | Idleman et al. ............... 714/6 |
| 5,491,816 | A | * | 2/1996 | Matoba et al. ............... 714/2 |
| 5,867,640 | A | * | 2/1999 | Aguilar et al. ............... 714/6 |
| 6,324,655 | B1 | * | 11/2001 | Matoba et al. ............... 714/7 |
| 6,850,998 | B2 | * | 2/2005 | Inoue et al. ............... 710/38 |
| 6,915,380 | B2 | * | 7/2005 | Tanaka et al. ............... 711/114 |
| 6,971,042 | B2 | * | 11/2005 | Anderson ............... 714/6 |
| 2003/0191891 | A1 | | 10/2003 | Tanaka et al. |
| 2003/0200478 | A1 | * | 10/2003 | Anderson ............... 714/5 |
| 2006/0107098 | A1 | * | 5/2006 | Maki et al. ............... 714/6 |

FOREIGN PATENT DOCUMENTS

JP      2003-303055      4/2002

* cited by examiner

*Primary Examiner*—Robert Beausoliel
*Assistant Examiner*—Elmira Mehrmanesh
(74) *Attorney, Agent, or Firm*—Reed Smith LLP; Juan Carlos A. Marquez, Esq.

(57) ABSTRACT

The storage control device of the present invention detects faults on the disk drives at an early stage, thus enhancing convenience of use. The disk drives are switchingly connected to a subordinate communication control unit via a switching circuit. An error information collection unit of an error monitoring unit detects errors which have occurred at each port of the switching circuit. The errors which have been detected are stored in an intermediate storage unit, and are input via an error information notification unit to a fault recovery control unit of the subordinate communication control unit. By doing this, it is possible to immediately specify whether or not a fault has occurred on any of the disk drives, and to start a fault recovery procedure.

17 Claims, 23 Drawing Sheets

STORAGE CONTROL DEVICE, AND ERROR INFORMATION MANAGEMENT METHOD FOR STORAGE CONTROL DEVICE

CROSS-REFERENCE TO RELATED APPLICATION

This application relates to and claims priority from Japanese Patent Application No. 2005-337836 filed on Nov. 22, 2005, the entire disclosure of which is incorporated herein by reference.

BACKGROUND OF THE INVENTION

1. Field of the Invention

The present invention relates to a storage control device, and to an error information management method for a storage control device.

2. Description of the Related Art

A storage control device provides to a host computer (hereinafter simply termed a host), a storage region based on, for example, a RAID (Redundant Array of Independent Disks), which is made by arranging storage devices such as, for example, hard disks in an array configuration. At least one or more logical volume is created on the physical storage region provided by this storage device group, and this logical volume is provided to the host. The host writes data into and reads out data from this logical volume by transmitting predetermined commands.

A plurality of storage devices may be connected in digi-chain mode by a circuit called a port bypass circuit. Or, alternatively, a technique is per se known of connecting a plurality of storage devices with crossbar switches (refer to Japanese Patent Laid-Open Publication 2003-303055).

If a plurality of storage devices present on the same path are connected together by the digi-chain method, when a fault occurs on any one from among these storage devices, it also becomes impossible to use all of the other normal storage devices which are on that path. This is because the path is interrupted. It would seem that, if a secondary path (a redundant path) were provided, it would be possible to access the normal storage devices by changing over from the primary path to the secondary path. However, time would be required to change over between the paths, so that the responsiveness of the storage control device would be deteriorated.

It should be understood that, by switchingly connecting the storage devices with the technique described in the above identified document, the throughput between the disk adapters and the storage devices is enhanced. However, in the technique of that document, no consideration is given to methods for detecting faults that occur on the storage devices, or to methods of recovering from such faults, so that room for improvement remains.

SUMMARY OF THE INVENTION

The present invention has been made in the light of the above described problems, and one of its objects is to provide a storage control device and an error information management method for a storage control device, which are adapted to enhance fault tolerance. Another object of the present invention is to provide a storage control device and an error information management method for a storage control device, which can enable detection of faults occurring with the storage devices and recovery of such faults automatically, and which can thereby enhance the fault tolerance and the convenience of use. Other objects of the present invention will become clear from the following explanation of preferred embodiments thereof.

In order to solve the above described problems, according to a one aspect thereof, the present invention provides a storage control device, including: a host communication control unit which controls communication with a host device; a subordinate communication control unit which controls communication with a plurality of storage devices; and a connection control unit which switchingly connects the storage devices and the subordinate communication control unit; wherein the connection control unit includes an error monitoring unit which monitors error information for each of the storage devices. Thus, the connection control unit may connect a communication port which is directly or indirectly connected to the connection control unit to any one of other communication ports which are respectively connected to the storage devices. The storage control device according to the present invention is able to detect access faults or symptoms of access faults by monitoring in the interior of the connection control unit for errors occurring on each of the storage devices.

In a particular specialization of this aspect of the present invention, the error monitoring unit transmits the error information to the subordinate communication control unit, if a request has been received from the subordinate communication control unit. In other words, the monitoring of the error information by the error monitoring unit and the acquisition of the error information by the subordinate communication control unit is asynchronous. Due to this, even if an intermittent error in a storage device is detected, it is possible to prevent access to this storage device being stopped due to this insignificant error.

In another particular specialization of the present invention, the subordinate communication control unit detects, based on the result of communication with the storage device, whether or not an error has occurred, and if an error is detected, requests the error monitoring unit to transmit the error information. In other words, if a fault in access to a storage device has been detected, the subordinate communication control unit requests the error monitoring unit to acquire the error information. Accordingly, the subordinate communication control unit acquires the error information only when an access fault has occurred, so that it is possible to specify the storage device which is faulty.

And, in another particular specialization of the present invention, the subordinate communication control unit specifies a storage device on which a fault has occurred based on the error information acquired from the error monitoring unit, and executes a fault recovery procedure for recovering data stored on the storage device on which the fault has occurred. By specifying the storage device on which an access fault has occurred and performing the fault recovery procedure automatically, the fault tolerance and the convenience of use are enhanced. As a fault recovery procedure, for example, there may be cited a method of data recovery in which data and parity are acquired from another storage device which is included in a RAID group with the storage device on which the fault has occurred, and the data is recovered by performing calculations based on this data and parity.

And, in yet another particular specialization of the present invention, the connection control unit includes a plurality of switching circuits which are connected to the respectively differing plurality of storage devices via a plurality of communication ports, and a control circuit which is connected to each of the switching circuits; and the error monitoring unit includes: error information collection units, provided within the switching circuits respectively, which detect errors respectively occurring at the communication ports included in the switching circuits, and store the errors as error information; an intermediate storage unit, provided within the control circuit, which reads out and stores the error information stored in the error information collection units at respective predetermined timings; and an error information transmission unit, provided within the control circuit, which transmits the error information stored in the intermediate storage unit to the subordinate communication control unit in response to a request from the subordinate communication control unit. In other words, it is possible to monitor the error states of the storage devices separately and individually by detecting respective errors which have occurred at the communication ports which are connected to the storage devices. After having stored this individual error information temporarily in the intermediate storage unit within the control circuit, it is transmitted via the error information transmission unit to the subordinate communication control unit. If, for example, the intermediate storage unit includes a non-volatile memory, then, even if the connection control unit has been removed from the storage control device, the error information can continue to be kept just as it is, and thereafter it may be helpful in the task of error analysis or the like.

And, in still another particular specialization of the present invention, each of the error information collection units includes error counters, provided to the respective communication ports, and a register which stores the count values of the respective error counters as the error information; and each of the error counters increments the count value, if the bit pattern of data flowing through the communication port agrees with a predetermined error pattern which is set in advance.

And, in even another particular specialization of the present invention, the intermediate storage unit requests the error information collection units to acquire the error information at a predetermined cycle which is set in advance; and the error information collection units, in response to the requests from the intermediate storage unit, transfer the count values of the error counters to the register, and transfer the count values stored in the register to the intermediate storage unit.

Moreover, in another particular specialization of the present invention, each of the switching circuits includes a port management table indicating a correspondence relationship between the storage devices and the communication ports, and uses this port management table for switchingly connecting together the subordinate communication control unit and a specified communication port among the communication ports.

Furthermore, in yet another particular specialization of the present invention, the switching circuits may be connected in series. Instead of this, the switching circuits may be connected by taking a specified switching circuit as a center, and by connecting all of the other switching circuits to the specified switching circuit. Or, the switching circuits may be connected in a ring shape.

According to still another particular specialization of the present invention, when detecting a predetermined error which is set in advance as an error of which the urgency is high, the error monitoring unit immediately notifies the subordinate communication control unit of the fact that the predetermined error is detected.

And, according to a different particular specialization of the present invention, the error monitoring unit includes a signal generator which generates a predetermined pattern for testing set in advance, supplies the pattern for testing to a storage device among the storage devices which is not connected to the subordinate communication control unit, and detects the error based on a response signal from the storage device to the pattern for testing.

And, in order to solve the problems described above, according to another aspect thereof, the present invention provides an error information management method for a storage control device which includes a host communication control unit which controls communication with a host device, a subordinate communication control unit which controls communication with a plurality of storage devices, and a connection control unit which switchingly connects the storage devices and the subordinate communication control unit; wherein the connection control unit executes: a step of determining whether or not bit patterns which have appeared at communication ports respectively connected to the storage devices agree with a predetermined error pattern which is set in advance; a step of, if a bit pattern agreeing with the error pattern has appeared at one of the communication ports, increasing the count value of an error counter of that communication port; a step of determining whether or not a predetermined time period determined in advance has elapsed; a step of, if the predetermined time period has elapsed, acquiring and storing the respective count values of the error counters; a step of determining whether or not an access error to any one of the storage devices from the subordinate communication control unit has been detected; a step of, if a the access error has been detected, acquiring the respective stored count values; and a step of specifying the storage device on which the fault has occurred based on the count values which have been acquired.

Furthermore, there may be included a step of transmitting information relating to the specified storage device to an external management terminal.

Moreover, there may be included a step of recovering data stored on the specified storage device.

Yet further, the step of recovering the data may include: a step of selecting an unused storage device among the storage devices; a step of reconstructing the data stored on the specified storage device based on data stored on another storage device which makes up a RAID group with the specified storage device; and a step of storing the reconstructed data on the unused storage device which has been selected.

Any or all of the means, units, functions, or steps of the present invention may be implemented as a computer program which is executed by a computer system. And, if any or all of the means, units, functions, or steps of the present invention is thus implemented as a computer program, this computer program may, for example, be distributed or the like by being fixed on some type of storage medium, or by being transmitted via a communication network or the like.

DESCRIPTION OF THE PREFERRED EMBODIMENTS

Figure 1:
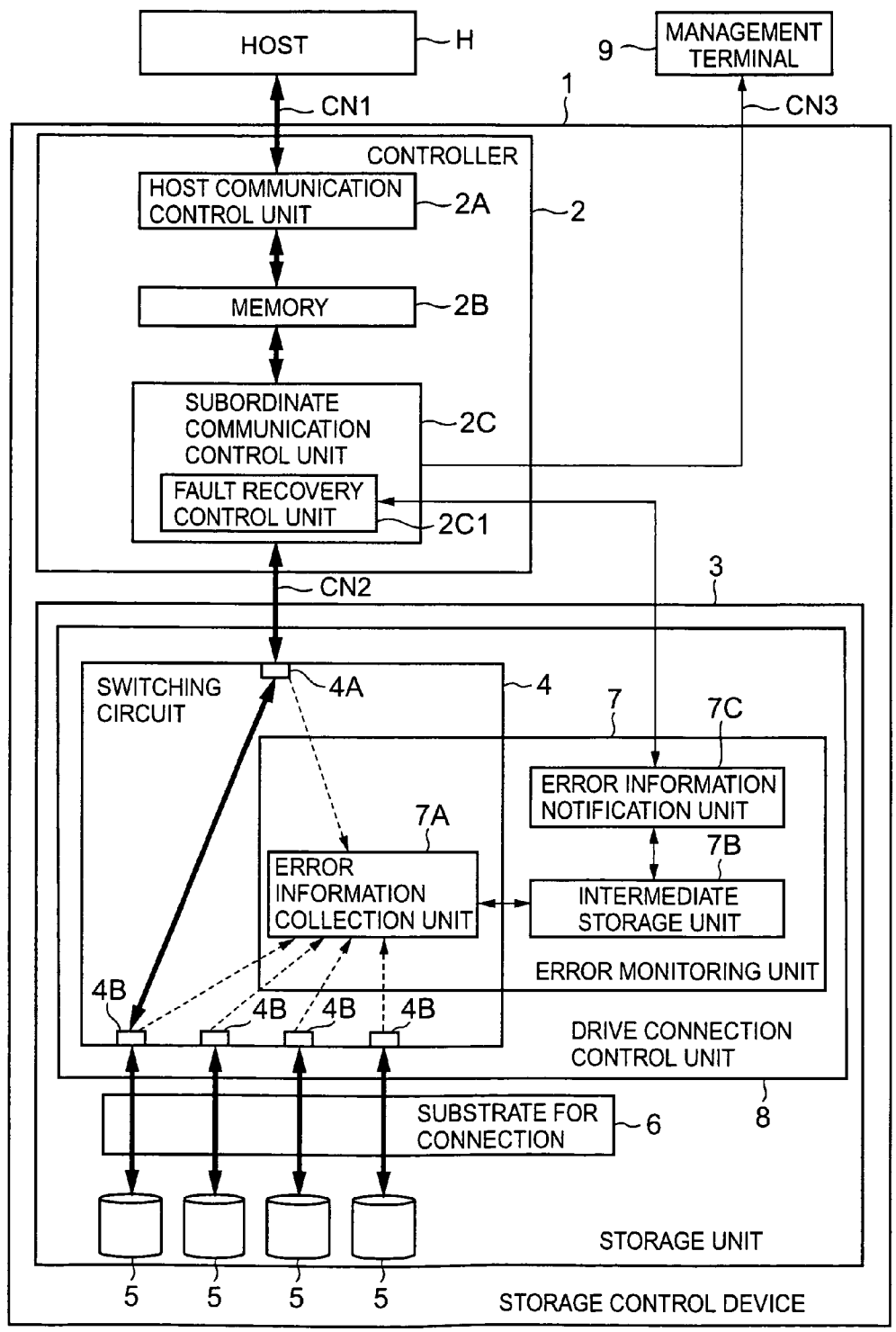
FIG. 1 is an explanatory figure showing a summary of a first preferred embodiment of the present invention.

FIG. 1 is an explanatory figure showing an overall summary of an embodiment of the present invention. The storage control device 1 of this embodiment comprises a controller 2 and a storage unit 3, and provides data storage service for a host H.

The controller 2 is a device for controlling the overall operation of the storage control device 1. This controller 2, for example, may comprise a host communication control unit 2A, a memory unit 2B, and a subordinate communication control unit 2C.

The host communication control unit 2A is a device which controls communication with the host H. This host H may be, for example, a computer device such as a server computer, a mainframe, or the like, and it issues commands to the storage control device 1. And the host communication control unit 2A performs procedures corresponding to the commands which it has received from the host H.

The subordinate communication control unit 2C is a device which controls communication between the storage unit 3 and disk drives 5. This subordinate communication control unit 2C reads out data which has been requested from the host H from a designated disk drive 5, and stores it in the memory unit 2B. And the host communication control unit 2A reads out this data which has been stored in the memory unit 2B, and transmits this data to the host H. Furthermore, if a write request has been made from the host H, the subordinate communication control unit 2C is arranged to write in the write data to a designated disk drive 5. Moreover, a fault recovery control unit 2C1 is provided to the subordinate communication control unit 2C. If an access fault to the disk drive 5 has been detected, this fault recovery control unit 2C1 executes procedures for recovery from this fault.

The structure of the storage unit 3 will now be explained. This storage unit 3 is a device for storing various different types of data used by the host H. And this storage unit 3 may comprise, for example, a plurality of switching circuits 4, a plurality of disk drives 5, a substrate for connection 6, and an error monitoring unit 7. And a drive connection control unit 8 comprises a switching circuit 4 and the error monitoring unit 7.

The switching circuit 4, for example, may comprise a single common port 4A and a plurality of device connection ports 4B. Although, in the figure, a case is shown in which four of the disk drives 5 are shown as being connected to a single switching circuit 4, actually, a plurality of switching circuits 4 are provided, and a plurality of disk drives 5 are connected to each one of these switching circuits 4. Based on commands input from the subordinate communication control unit 2C, the switching circuit 4 connects the common port 4A and any one of the device connection ports 4B together in a one-to-one manner, so that full duplex communication is performed between these ports 4A and 4B.

The plurality of disk drives 5 are attached to the substrate for connection 6. Signal lines for connecting together the disk drives 5 and the switching circuits 4 and power source lines for supplying source power to the disk drives 5 are formed on the substrate for connection 6. The disk drives 5 are storage devices such as, for example, hard disk drives or semiconductor memory drives, or optical disk drives or magnetic tape drives. Each of the disk drives 5 is connected to one of the switching circuits 4 via the substrate for connection 6, and is further connected to the subordinate communication control unit 2C via that switching circuit 4.

The error monitoring unit 7 may comprise, for example, an error information collection unit 7A, an intermediate storage unit 7B, and an error information notification unit 7C. The error information collection unit 7A collects error information which indicates the occurrence of errors by monitoring the data flowing through the ports 4A and 4B. This error information which has been collected is stored in the intermediate storage unit 7B. Upon a request from the subordinate communication control unit 2C, the error information notification unit 7C reads out the error information which is stored in the intermediate storage unit 7B, and transmits this read out error information to the subordinate communication control unit 2C.

A management terminal 9 is a computer device for managing the state of the storage control device 1. This management terminal 9 issues structural alteration instructions to the controller 2, and acquires various types of status information relating to the storage control device 1.

Next, the network structure will be explained. The host H and the storage control device 1 are connected together so as to be able to perform two-way communication via a communication network CN1 such as, for example, a SAN (Storage Area Network) or the Internet. The controller 2 and the storage unit 3 are connected together so as to be able to perform two-way communication via a communication network CN2 such as, for example, a SAN (Storage Area Network). The controller 2 and the management terminal 9 are connected together so as to be able to perform two-way communication via a communication network CN3 such as, for example, a LAN (Local Area Network).

The operation of this embodiment will now be explained. The host H issues a read command or a write command to the storage control device 1. Upon receipt thereof, the controller 2 accesses the designated disk drive 5 via the drive connection control unit 8, and (in the case of a read command) reads out the data requested by the host H from the designated disk drive 5 and supplies it to the host H. Or (in the case of a write command) the controller 2 accesses the designated disk drive 5 via the drive connection control unit 8, divides the write data which it has received from the host H into block data, and stores this block data in the designated disk drive 5.

Here, by connecting together the common port 4A and any one of the device connection ports 4B, the switching circuit 4 connects together the specified disk drive 5 and the subordinate communication control unit 2C. In some cases, the data may be dispersed and stored on a plurality of the disk drives 5 by a plurality of the device connection ports 4B being cyclically changed over.

The error monitoring unit 7 monitors for errors occurring on the disk drives 5. The error information collection unit 7A, for example, monitors the bit patterns of the data flowing through the ports 4A and 4B, and determines whether or not previously known error patterns have been detected.

For example, although the subordinate communication control unit 2C and the disk drives 5 may perform data transfer at the block level based on a fiber channel protocol, in a fiber channel protocol, it is forbidden for the bit "0" or "1" to continue for more than a predetermined number of times. Accordingly, the error information collection unit 7A is able to monitor for errors which have occurred at the ports. Or it may be detected that some error has occurred on a disk drive 5, if the response when some data has been input to this disk drive 5 is different from the anticipated value. Due to this, the error information collection unit 7A monitors both the data which is input from the common port 4A and also the data which is returned from the device connection ports 4B.

An error which has been detected is stored in the intermediate storage unit 7B as error information, such as, for example, an error count value for each of the device connection ports 4B. If, for example, a hindrance has occurred to access to a disk drive 5, the subordinate communication unit 2C requests the error monitoring unit 7 to transfer error information. Upon receipt of this request from the subordinate communication control unit 2C, the error monitoring unit 7 transmits the error information which is stored in the intermediate storage unit 7B from the error information notification unit 7C to the subordinate communication control unit 2C.

In other words, when the occurrence of an error on any one of the disk drives 5 has been detected by the error monitoring unit 7, the error information relating thereto is not immediately reported to the subordinate communication control unit 2C. Rather, if the subordinate communication control unit 2C has recognized an access fault to one of the disk drives 5, the error information relating thereto is transmitted from the error monitoring unit 7 to the subordinate communication control unit 2C. And, based on this error information, the subordinate communication control unit 2C determines whether or not to perform a fault recovery procedure, and, if it is necessary, performs that fault recovery procedure.

According to this embodiment structured as described above, the structure is such that, along with switchingly connecting together the disk drives 5 and the subordinate communication control unit 2C, the error information which has occurred on the disk drives 5 is individually monitored. Accordingly, it is possible to discover at an early stage on which of the disk drives 5 a fault has occurred, so that the convenience of use is enhanced.

With this embodiment the structure is such that, when the subordinate communication control unit 2C has issued a request, the error monitoring unit 7 notifies the error information to the subordinate communication control unit 2C. Accordingly, if an intermittent error of which the urgency is comparatively low has been detected, it is possible to suppress the closing down procedure or the commencement of the fault recovery procedure for this disk drive 5, due to the occurrence of this insignificant error. As a result, in a case such as one in which, for example, there is no influence on the storage control device 1 operating properly, it is possible to continue using the disk drive 5 on which the fault has occurred, without performing any closing down procedure. Due to this, it is possible to increase the operating time of the storage control device 1, and furthermore it is possible to suppress deterioration of the responsiveness due to execution of the closing down procedure or the fault recovery procedure, so that the convenience of use is enhanced.

In this embodiment the structure is such that, if the subordinate communication control unit 2C has recognized that a fault has occurred in access to a disk drive 5, it acquires the error information from the error monitoring unit 7. Accordingly, it is possible to alleviate the processing load on the error monitoring unit 7 and the subordinate communication control unit 2C, as compared to the case in which the error information is acquired cyclically.

In this embodiment the structure is such that, if a fault has been detected on a disk drive 5, this fault is automatically recovered by the fault recovery control unit 2C1. Accordingly, it is possible to enhance the fault tolerance and the convenience of use.

Embodiment 1

A first preferred embodiment of the present invention will now be explained in detail. To discuss the relationship with FIG. 1 first, respectively: the host H in FIG. 1 corresponds to the host 20 in FIG. 3; the storage control device 1 in FIG. 1 corresponds to the storage control device 10 in FIG. 3; the controller 2 in FIG. 1 corresponds to the controller 100 in FIG. 3; the storage unit 3 in FIG. 1 corresponds to the storage unit 200 in FIG. 3; the management terminal 9 in FIG. 1 corresponds to the management terminal 30 in FIG. 3; the host communication control unit 2A in FIG. 1 corresponds to the CHA 110 in FIG. 3; the subordinate communication control unit 2C in FIG. 1 corresponds to the DKA 120 in FIG. 3; the memory unit 2B in FIG. 1 corresponds to the cache memory 130 and the common memory 140 in FIG. 3; the disk drive 5 in FIG. 1 corresponds to the disk drive 210 in FIG. 3; the substrate for connection 6 in FIG. 1 corresponds to the substrate for connection 220 in FIG. 3; the drive connection control unit 8 in FIG. 1 corresponds to the connection control unit 230 in FIG. 3; and the switching circuit 4 in FIG. 1 corresponds to the switching circuit 240 in FIG. 3.

Figure 2:
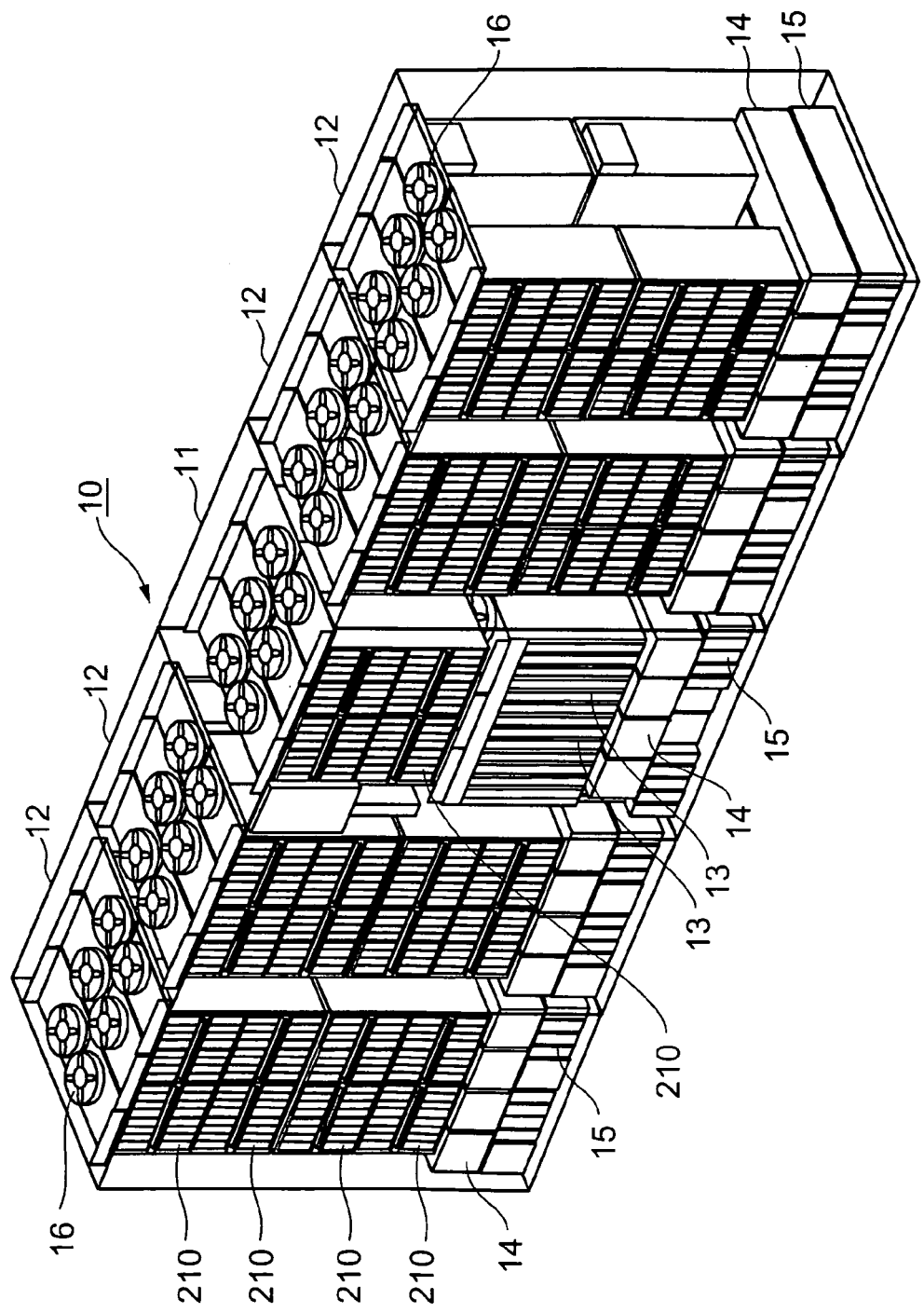
FIG. 2 is a perspective view showing the external structural appearance of a storage control device.

FIG. 2 is a perspective view showing the external structural appearance of the storage control device 10 in general perspective view. This storage control device 10 may comprise, for example, a main chassis 11 and a plurality of extension chassis 12.

The main chassis 11 is the minimum structural unit of this storage control device 10, and it is endowed with both a storage function and a control function. And the extension chassis 12 are options for the storage control device 10, and are controlled by the control function with which the main chassis 11 is endowed. For example, a maximum of four extension chassis 12 may be connected to the main chassis 11.

To the main chassis 11, for example, there may be provided a plurality of control packages 13, a plurality of power source units 14, a plurality of battery units 15, a plurality of disk drives 210, each being fittable and removable as desired. To the extension chassis 12, there may be provide a plurality of disk drives 210, a plurality of power source units 14, and a plurality of battery units 15, each likewise being fittable and removable as desired. Furthermore, a plurality of cooling fans 16 are also provided to the main chassis 11 and to each of the extension chassis 12. The main chassis 11 and the extension chassis 12 are connected together by, for example, metal cable or fiber cable, and perform mutual communication based on a fiber channel protocol.

A control package 13 is a module for implementing a channel adapter (hereinafter termed a CHA) 110, a disk adapter (hereinafter termed a DKA) 120, a cache memory 130, a common memory 140, and the like, all described hereinafter. In other words, a plurality of CHA packages, a plurality of DKA packages, and one or more memory packages are provided to the main chassis 11, each of them being fittable and removable as desired; and it is possible to exchange them one package at a time.

Figure 3:
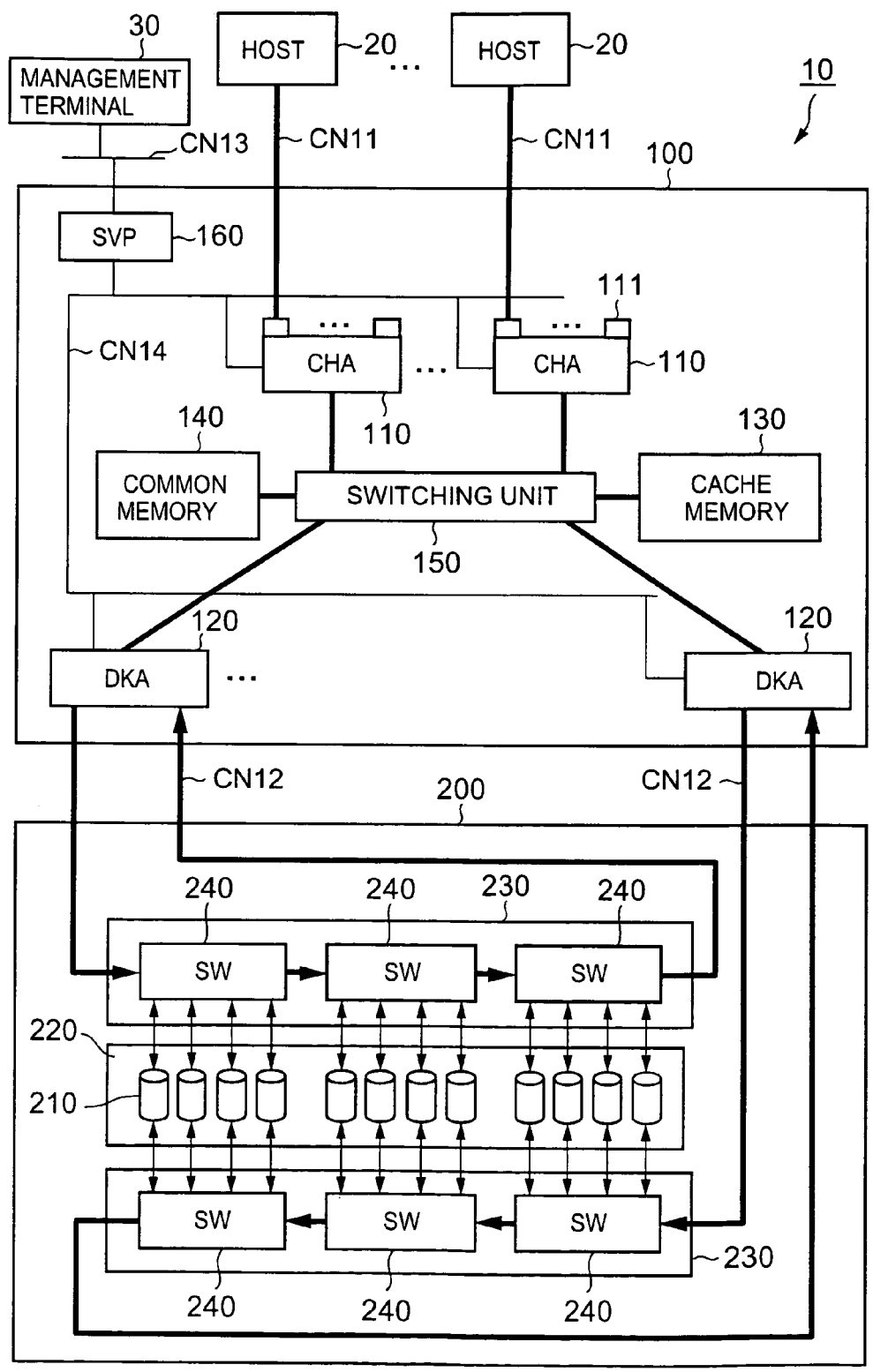
FIG. 3 is a block diagram of the storage control device.

FIG. 3 is a block diagram showing an overall view of the storage control device 10. This storage control device 10 is capable of connecting together a plurality of hosts 20 via a communication network CN11 so that they are each capable of performing two-way communication. The storage control device 10, as described hereinafter, comprises a controller 100 for controlling the operation of the storage control device 10, and a storage unit 200.

The communication network CN11 is, for example, a LAN, a SAN (Storage Area Network), the internet, or a dedicated circuit or the like. If a LAN is used, data transfer between a host 20 and the storage control device 10 is performed according to TCP/IP. If a SAN is used, the host 20 and the storage control device 10 perform data transfer according to a fiber channel protocol. Furthermore, if the host 20 is a mainframe, data transfer may be performed according to a communication protocol such as, for example, FICON (Fibre Connection: a registered trademark), ESCON (Enterprise System Connection: a registered trademark), ACONARC (Advanced Connection Architecture: a registered trademark), FIBARC (Fibre Connection Architecture: a registered trademark).

Each of the hosts 20 is, for example, implemented as a server, a personal computer, a workstation, a mainframe, or the like. For example, each of the hosts 20 may be connected via another communication network with a plurality of client terminals outside the figure. Each of the hosts 20, for example, may provide service to each of its client terminals, in response to requests from those client terminals, by performing reading and writing of data to and from the storage control device 10.

Each of the CHAs 110 comprises a plurality of communication ports 111 for controlling data transfer with each of the hosts 20. For example 32 CHAs 110 may be provided to the storage control device 10. The CHAs 110 may be provided according to the types of the hosts 20, such as, for example, open type CHAs, mainframe type CHAs.

Each of the CHAs 110 receives commands requesting the reading or writing of data from the host 20 to which it is respectively connected, and also receives data therefrom, and operates according to these commands which it has received from its host 20.

First, to explain the operation of the DKA 120 as well, when a CHA 110 receives a read command from a host 20, it stores this read command in the common memory 140. The DKA 120 refers to the common memory 140 as required, and, when it discovers a non-processed read command, it reads out the designated data from the disk drive 210, and stores it in the cache memory 130. And the CHA 110 read out this data which has been shifted to the cache memory 130, and transmits it to the host 20.

On the other hand, when the CHA 110 receives a write command from a host 20, it stores this write command in the common memory 140. Furthermore, the CHA 110 stores the write data which it has received in the cache memory 130. And, after having thus stored the write data in the cache memory 130, the CHA 110 reports to the host 20 that the writing has been completed. The DKA 120 reads out the data which has been stored in the cache memory 130 according to the write command which has been stored in the common memory 140, and stores it in the designated one of the disk drives 210.

The DKAs 120 may be provided in plurality within the storage control device 10; for example, four or eight or the like may be provided. These DKAs 120 are devices which control data communication with the respective disk drives 210. Each of the DKAs 120 is connected with its disk drives 210 via a connection control circuit (FSW) 230 or the like. And the DKAs 120 and the disk drives 210 perform data transfer by block units via the communication network CN12 such as, for example, a SAN, based on a fiber channel protocol. Furthermore, the DKAs 120 monitor the states of the disk drives 210 as required, and the results of this monitoring are transferred to a SVP 160 via an interior network CN14.

The CHAs 110 and the DKAs 120, for example, may comprise a printed substrate on which a processor and memory are implemented, and a control program which is stored in this memory, and they implement respective predetermined functions by the cooperative operation of this hardware and software. The CHAs 110 and the DKAs 120, together with the cache memory 130 and the common memory 140, constitute the controller 100.

The cache memory 130 is a device for storing, for example, data which has been received from the host 20 and the like. This cache memory 130 may consist of, for example, non-volatile memory. The common memory (or control memory) 140 may also consist of, for example, non-volatile memory. For example, control information and management information and the like are stored in this common memory 140. Information such as control information and the like may be managed on a multiplex basis by a plurality of these common memories 140.

It should be understood that the common memory 140 and the cache memory 130 may each be provided in plurality. Furthermore, the cache memory 130 and the common memory 140 may be implemented as coexisting beside one another on the same memory substrate. Or, one portion of the memory may be used as a cache memory, while another portion is used as a control region.

The switching unit 150 is connected to each of the CHAs 110, the DKAs 120, the cache memory 130, and the common memory 140. Due to this, all of the CHAs 110 and the DKAs 120 are able to access both the cache memory 130 and the common memory 140. The switching unit 150, for example, may comprise a crossbar switch or the like.

The service processor (SVP) 160 connects the CHAs 110 and the DKAs 120 together via the interior network CN14 such as a LAN. Furthermore, this SVP 160 may be connected to one or a plurality of management terminals 30 via a communication network CN13 such as a LAN. The SVP 160 collects various types of information on the status of the interior of the storage control device 10, and provides them to the management terminals 30. It should be understood that, alternatively, this SVP 160 may be connected only to the CHAs 110, or only to the DKAs 120. This is because the SVP 160 can collect the various types of status information via the common memory 140.

Next, the storage unit 200 of the storage control device 10 will be explained. As described above, this storage unit 200 in which a large number of the disk drives 210 are provided may be provided to both the main chassis 11 and the extension chassis 12.

Each of the disk drives 210 is implemented, for example, as a hard disk drive or a semiconductor memory drive or an optical disk drive or the like. The disk drives 210 are physical disk drives. Each of these disk drives 210, for example, may comprise a storage medium, a control circuit for reading and writing data to and from this storage medium, a cooling mechanism, a power source circuit, and the like.

Although RAID structures and the like differ somewhat, for example, a logical storage region which has been made redundant may be set up on a physical storage region which is provided by a predetermined number of disk drives 210 with, for example, three in one group or four in one group or the like. And at least one or more logical devices (LU: Logical Unit) may be created on this storage region which has been made redundant. These logical devices are put into correspondence with LUNs (Logical Unit Numbers), and are provided to the hosts 20. The hosts 20 may, for example, perform writing and reading of data by treating this logical device as an object for access.

It should be understood that the storage resources which are used by this storage control device 10 are not necessarily all provided within the storage control device 10. The storage control device 10 is able to employ storage resources which are present externally to the storage control device 10, treating them just as though they were its own storage resources. For example, if another storage control device is present, it is possible to utilize external storage resources by connecting this other storage control device and the storage control device 10 together via a SAN or the like, and by connecting a logical device possessed by the other storage control device to a virtual device provided at lower layer of the logical device of the storage control device 10.

Furthermore, the storage unit 200 comprises a connection control unit (hereinafter termed a FSW) 230 which comprises a plurality of switching circuits 240, and a substrate for connection 220 to which a plurality of disk drives 210 are fixed. The substrate for connection 220 is made as, for example, a printed wiring substrate, and various types of connectors and printed wiring for affixing the disk drives 210 are provided thereon. Each of the disk drives 210 is connected to the FSW 230 via the substrate for connection 220. Furthermore, each of the disk drives 210 is connected to a power source unit 14 and to a battery 15 via the substrate for connection 220.

The FSW 230 is a control circuit for controlling access from the DKA 120 to the disk drives 210. This FSW 230 may, for example, be provided in plurality. And, by connecting one of the FSWs 230 to one of the DKAs 120 and another of the FSWs 230 to another of the DKAs 120, even if a fault has occurred in any one of these paths, it is still possible to access the disk drives 210 via the remaining paths which are still in a normal condition. These FSWs 230 will be described in detail hereinafter.

Figure 4:
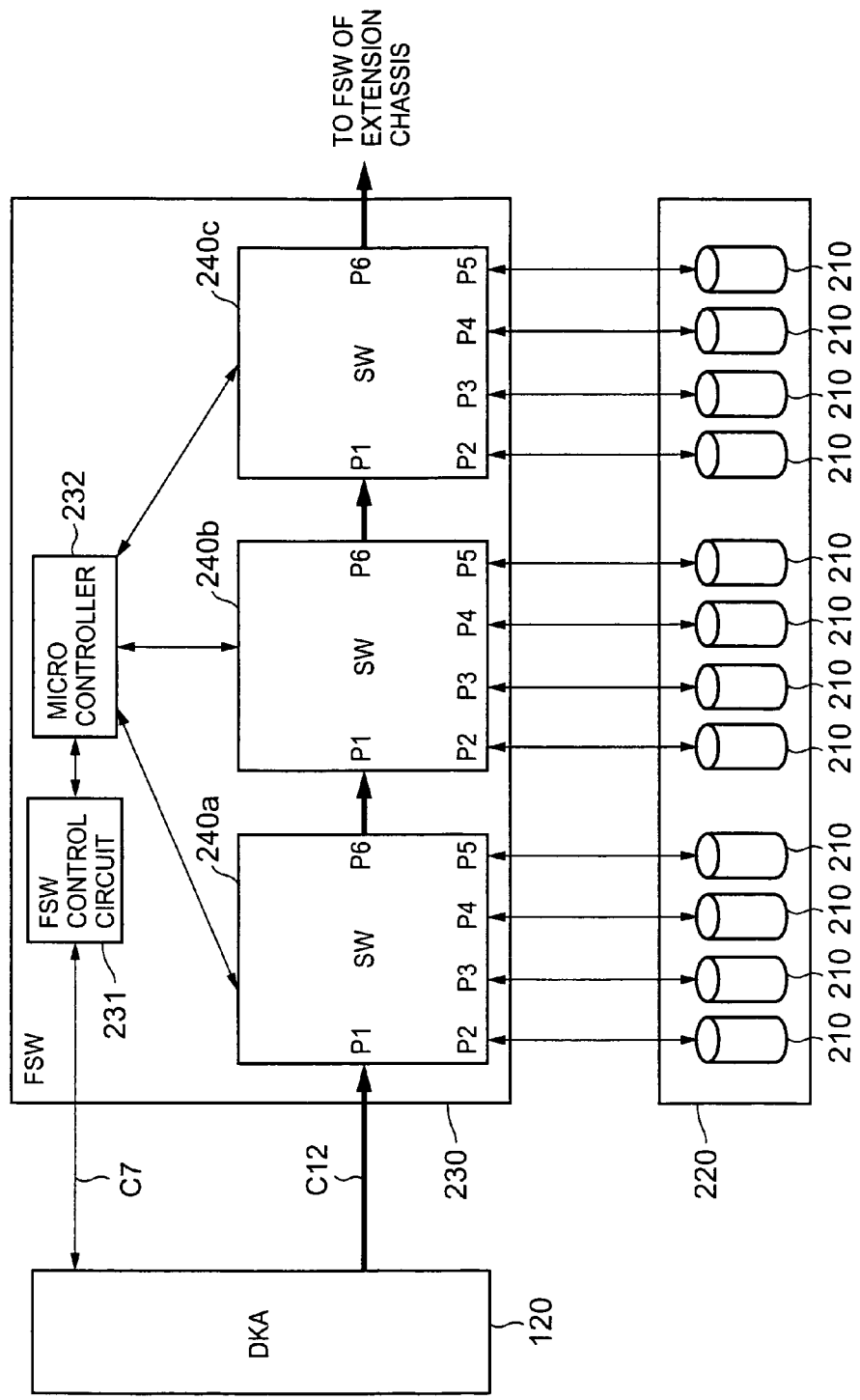
FIG. 4 is an explanatory figure showing the structure of a connection control circuit (FSW)

FIG. 4 is an explanatory figure showing the overall structure of the essential portions of one of the FSWs 230. This FSW 230 comprises a FSW control circuit 231, a micro controller 232 and a plurality of switching circuits 240. The FSW control circuit 231 is a circuit which, for example, monitors the voltage state of the storage unit 200 and the operational state of a cooling fan thereof and the like. Apart from this, the FSW control circuit 231 relays communication between the DKA 120 and the micro controller 232.

The FSW control circuit 231 is connected to the DKA 120 via a control line C7, and enables two-way communication with the DKA 120. Furthermore, the FSW control circuit 231 is also connected so as to enable two-way communication with the micro controller 232. Accordingly, the FSW control circuit 231 is able to relay communication between the micro controller 232 and the DKA 120. The FSW control circuit 231 corresponds to the "error information notification unit 7C", and the micro controller 232 corresponds to the "intermediate storage unit 7B". The FSW control circuit 231 and the micro controller 232 may be integrated together and embodied as a single chip integrated circuit.

A plurality of the switching circuits 240 are provided to the FSW 230. Although in FIG. 4 three of these switching circuits 240 are shown, this is not to be considered as being limitative; it would be possible to provide less than three, or four or more, of these switching circuits 240 to the FSW 230.

In the example shown in FIG. 4, each of the switching circuits 240 comprises, for example, a plurality of input and output ports (communication ports) P1 through P6. The port P1 is a common port for receiving data from other devices, while the ports P2 through P5 are device connection ports for connection to the disk drives 210. Furthermore, the port P6 is connected to the common port P1 of another switching circuit 240.

Although this matter will be described in more detail hereinafter, block data is input from the DKA 120 via the communication network CN12 to the initial switching circuit 240, is transferred from a designated port thereof to a designated one of the disk drives 210, and is written into this disk drive 210.

Figure 5:
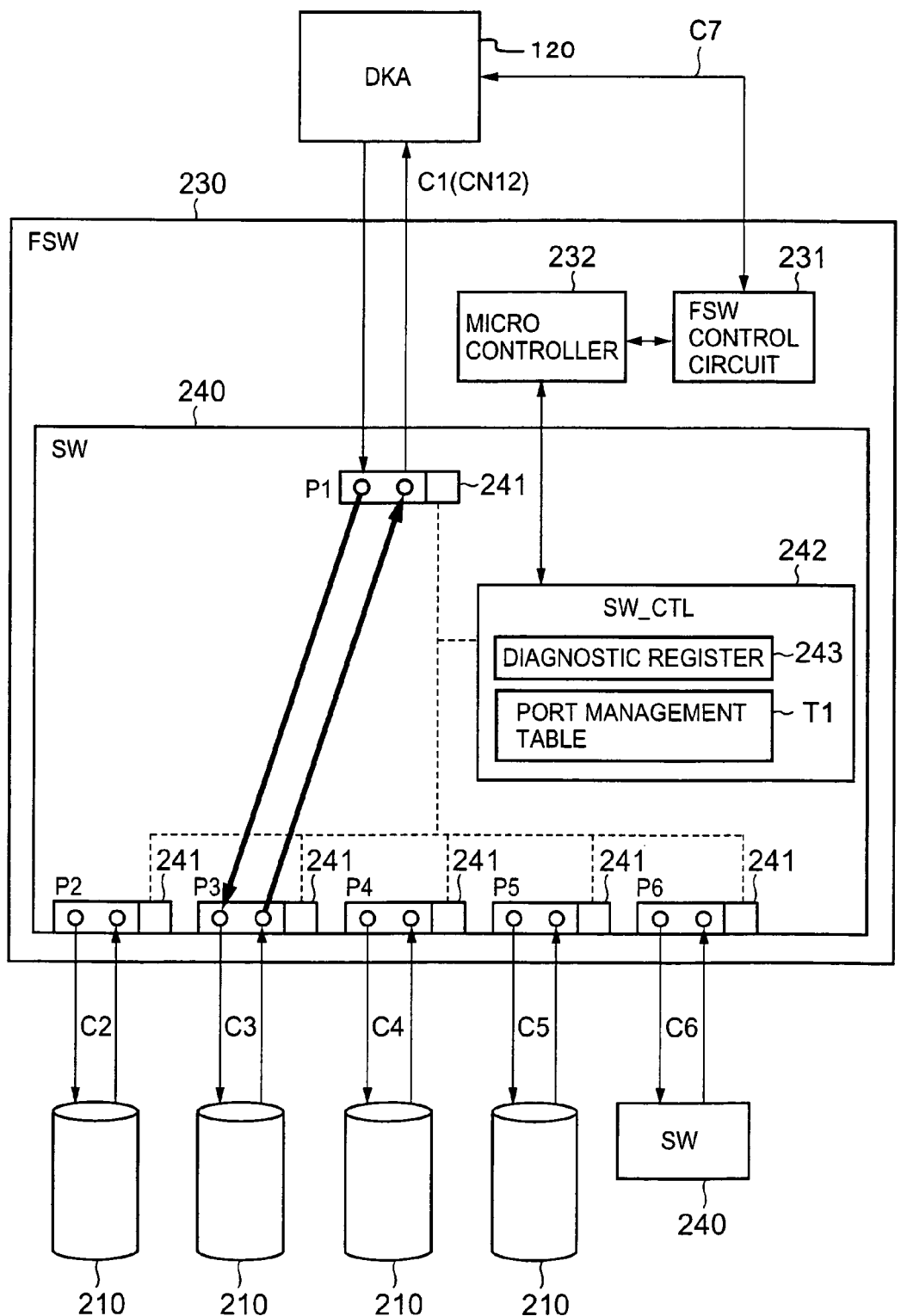
FIG. 5 is an explanatory figure showing the structure of a switching circuit.

FIG. 5 is an explanatory figure showing the overall functional structure of the FSW 230. A switching circuit 240 is arranged to connect its common port P1 one-to-one with any one from among its device connection ports P2 through P6. Each of these ports P1 through P6 is a communication port which is capable of full duplex communication. Accordingly, the disk drives 210 which are connected to the DKA 120 are capable of performing data communication with the DKA 120 at comparatively high speed.

An error counter 241 is provided to each of the ports. Although these error counters 241 will be described in greater detail hereinafter, each of the error counters 241 detects the presence or absence of errors by monitoring the patterns (bit arrays) of the data flowing through its port.

A switching control circuit (SW_CTL in the figure) 242 is provided to the switching circuit 240 for controlling the operation of the switching circuit 240. This switching control circuit 242 controls the connection between the common port P1 and the device connection ports P2 through P6, based on a port management table T1. Furthermore, the switching control circuit 242 stores the count values which it has acquired from the error counters 241 in a diagnostic register 243. And, according to a signal from the micro controller 232, this switching control circuit 242 transfers to the micro controller 232 the count values for each port which it has stored in the diagnostic register 243.

It should be understood that, in FIG. 5, there are provided a channel C1 between the DKA 120 and the common port P1, channels C2 through C5 between the respective device connection ports P2 through P5 and the disk drives 210, and a channel C6 between the port for connection P6 and the switching circuits 240 which are connected at subsequent stages.

Figure 6:
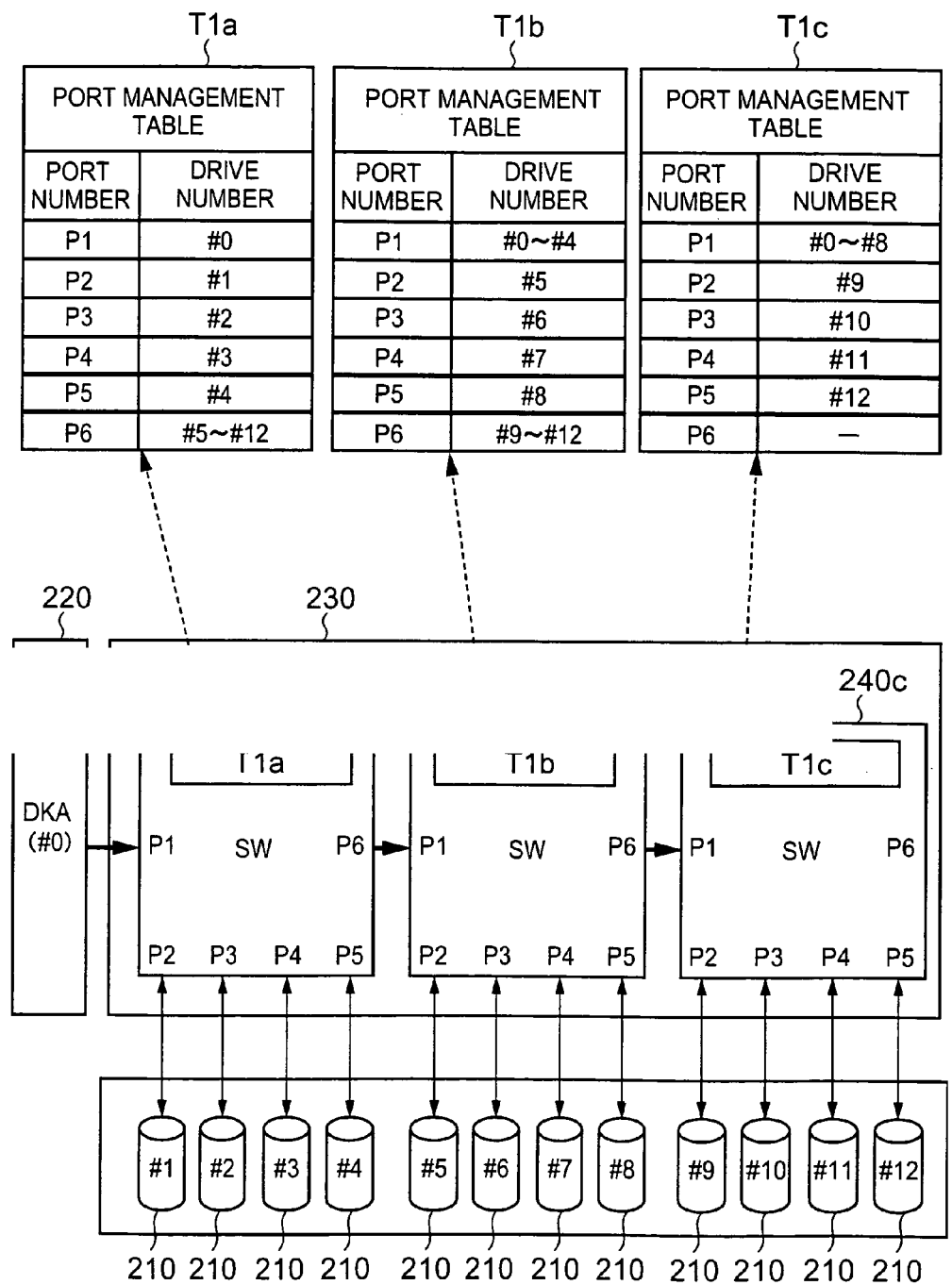
FIG. 6 is an explanatory figure showing a situation in which routing is performed within the switching circuit.

FIG. 6 is an explanatory figure showing an example of a routing method for the data. The explanation will be made in terms of an example in which the switching circuits 240a, 240b, and 240c are connected in series. As described above, a port management table T1 is provided in each of these switching circuits 240a through 240c. Here, for the convenience of explanation, the port management table of the switching circuit 240a which is initially connected to the DKA 120 will be supposed to be T1a, the port management table of the switching circuit 240b which is connected next will be supposed to be T1b, and the port management table of the switching circuit 240c which is connected last will be supposed to be T1c. It should be understood that the drive numbers are uniquely determined within the storage control device 10.

Each of the port management tables T1a through T1c is made by establishing a correspondence between port numbers and drive numbers. For example, in the table T1a, the drive number #0 is put into correspondence with the common port P1. This drive number #0 is a number which has been allocated to the DKA 120. The port P2 is put into correspondence with the drive number #1, the port P3 is put into correspondence with the drive number #2, the port P4 is put into correspondence with the drive number #3, the port P5 is put into correspondence with the drive number #4, and the port P6 is put into correspondence with the drive numbers #5 through #12. In other words, drive numbers for specifying all of the disk drives 210 which are connected to all of the subsequent stage switching circuits 240b and 240c are put into correspondence with the port for connection P6 which is connected to the next subsequent switching circuit 240b.

To consider the table T1b, in this table T1b, all of the drive numbers #0 through #4 for the drives which are connected to the previous stage switching circuit 240a are put into correspondence with the port P1 which is connected to the port P6 of that previous stage switching circuit 240a. And drive numbers #9 through #12 for those disk drives 210 which are under the management of the subsequently connected switching circuit 240c are put into correspondence with the port P6.

In the same manner, when the table T1c is considered, the drive numbers #0 through #8 for the drives connected to the previous stage switching circuits 240a and 240b which are positioned before this switching circuit 240c are put into correspondence with the port P1 which is connected to the port P6 of the previous stage switching circuit 240b. And no drive number is put into correspondence with the port P6. This is because, in this example, the switching circuit 240c is the final switching circuit, so that no subsequent switching circuit exists.

The DKA 120 issues a read command or a write command which explicitly specifies the objective drive number. By referring to the port management tables T1a through T1c based on the drive number which is thus explicitly stated in this command, each of the switching control circuits 242 of the switching circuits 240a through 240c determines whether this is a command which it must process itself, or whether it is a command which must be entrusted to another one of the switching circuits 240. And each of the switching circuits 240a through 240c connects its port P1 to one of its ports P2 through P6.

Figure 7:
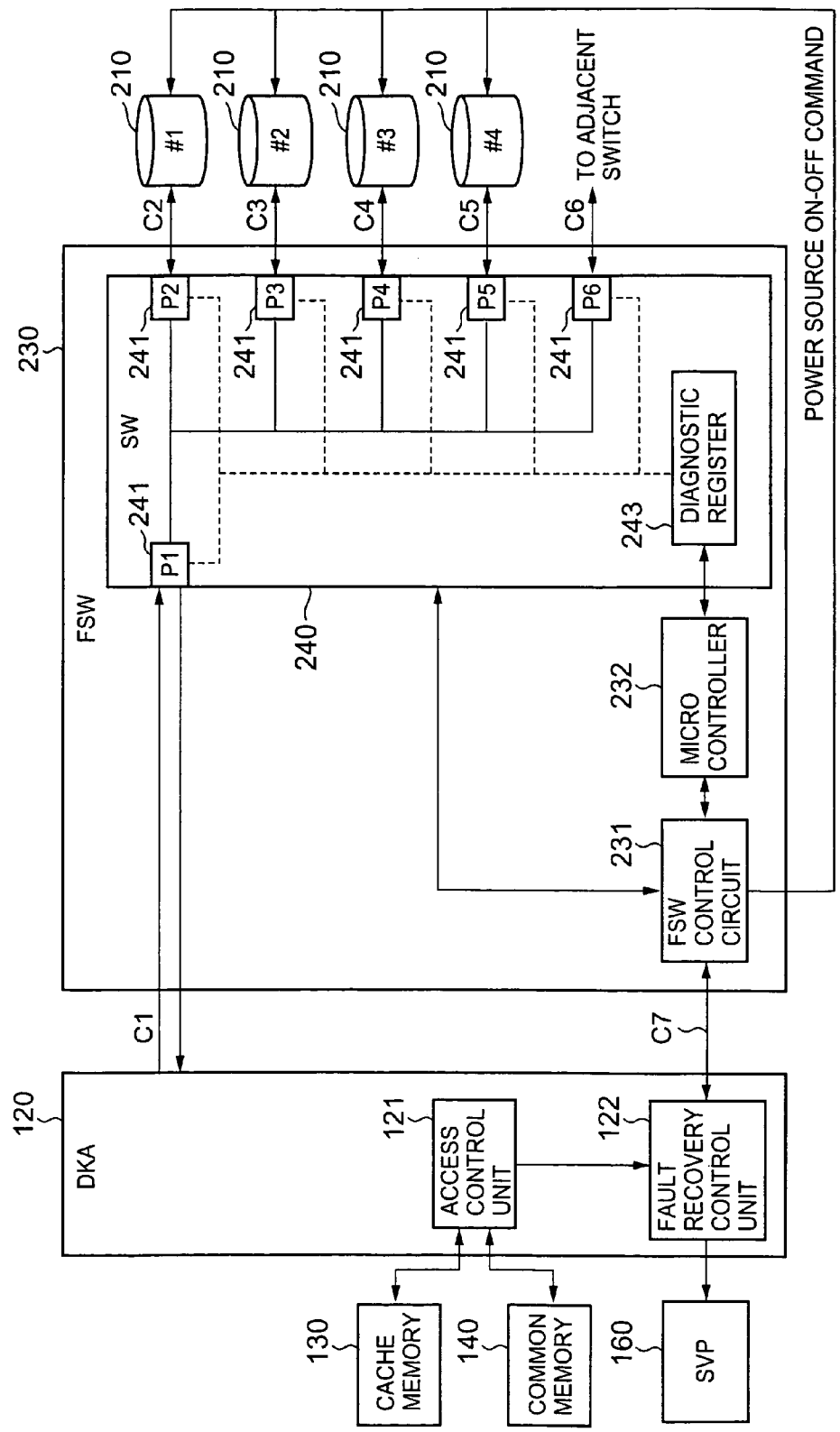
FIG. 7 is an explanatory figure showing the relationship between a connection control circuit and a DKA.

FIG. 7 is an explanatory figure showing the functional structures of the DKA 120 and the FSW 230. The DKA 120 comprises an access control unit 121 and a fault recovery control unit 122. The access control unit 121 is connected to both the cache memory 130 and the common memory 140. And based on a command stored in the common memory 140, the access control unit 121 accesses a designated disk drive 210, and reads or writes data.

For example, based on a read command which is stored in the common memory 140, the access control unit 121 accesses the designated disk drive 210, and reads out the data which has been requested. The address of the data which has thus been read out is converted to a logical address, and is stored in the cache memory 130. Furthermore, for example, based on a write which is stored in the common memory 140, the access control unit 121 accesses the designated disk drive 210, and writes the write data which has been stored in the cache memory 130 into the designated disk drive 210.

The DKA 120 performs access while switching over between the plurality of disk drives 210. In this case, in response to a request from the DKA 120, the switching circuits 240 connect the designated one of the disk drives 210 to the DKA 120.

When performing these commands, the access control unit 121 is capable of detecting whether or not a fault has occurred in access to the designated disk drive 210. For example, if the anticipated result has not been obtained from the disk drive 210, then the access control unit 121 may recognize that an access fault has occurred, an may request the fault recovery unit 122 to recover from this fault.

The fault recovery control unit 122 is connected to a SVP 160. In response to a request from the access control unit 121, the fault recovery control unit 122 reads out the fault information which is stored in the micro controller 232, and starts procedures for recovering from this fault automatically. Furthermore, the fault recovery control unit 122 performs notification with regard to the occurrence of the fault and with regard to fault recovery via the SVP 160 to the management terminal 30.

Figure 8:
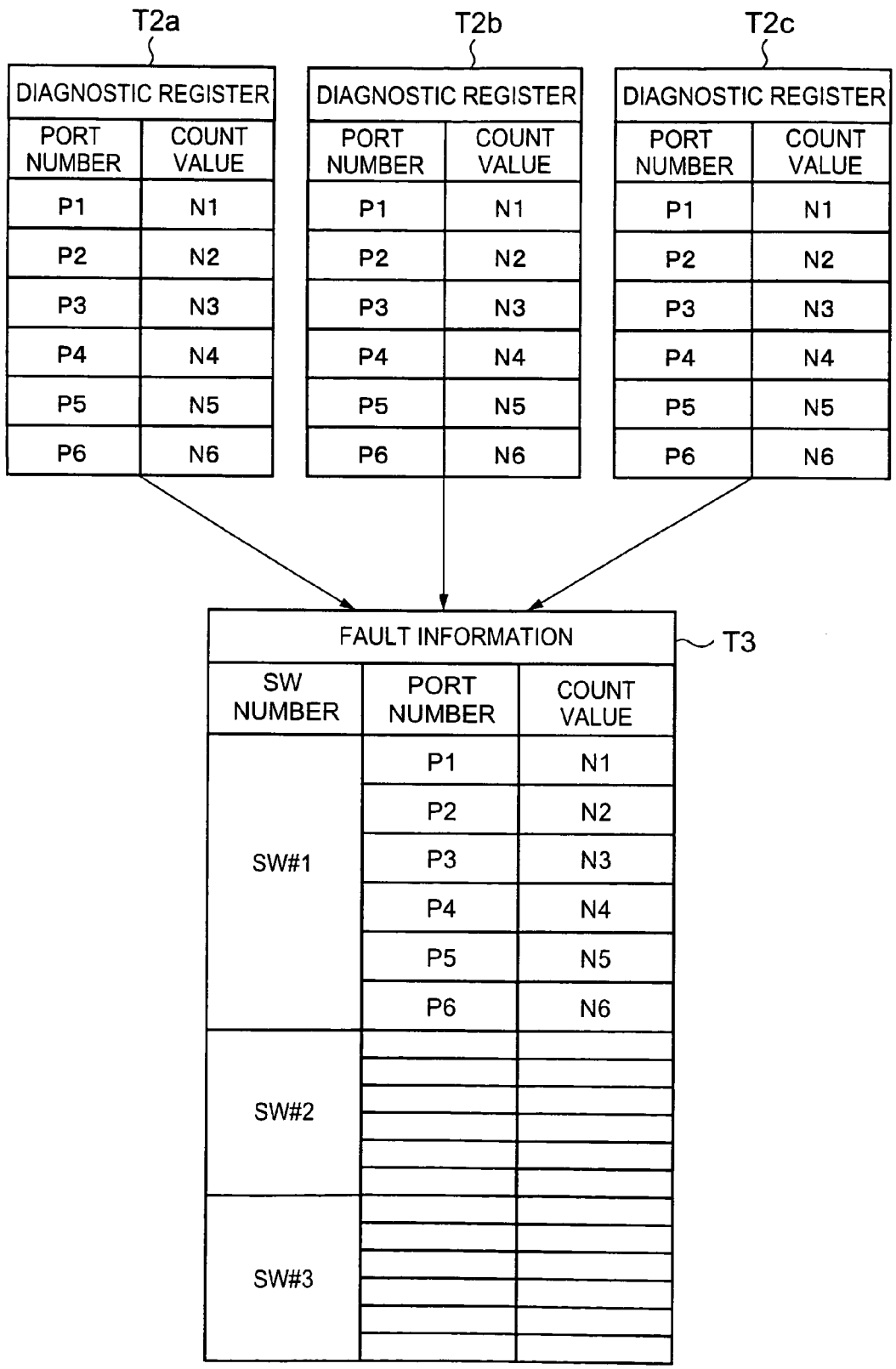
FIG. 8 is an explanatory figure showing the relationship between the stored contents of diagnostic registers and fault information.

FIG. 8 is an explanatory figure showing the relationship between the contents of the diagnostic registers 243 and fault information T3. Here, the symbol a through c is appended to the stored contents of each of the diagnostic registers 243 corresponding to the switching circuits 240a through 240c respectively, just as in FIG. 6. As shown in the upper portion of FIG. 8, each of the diagnostic registers 243 stores a count value in correspondence to each of its port numbers. These count values are the number of errors which have been detected at each of the ports.

As shown in the lower portion of FIG. 8, the micro controller 232 acquires the stored contents T2a through T2c from the diagnostic registers 243 of the switching circuits 240, and stores them as fault information T3. The micro controller 232, for example, may comprise a non-volatile memory. This fault information T3 is stored in the internal memory of the micro controller 232. This fault information T3 may consist of, for example, a switch number for identifying the switching circuit 240, a port number for identifying the ports, and an error count value, all in correspondence with one another.

Figure 9:
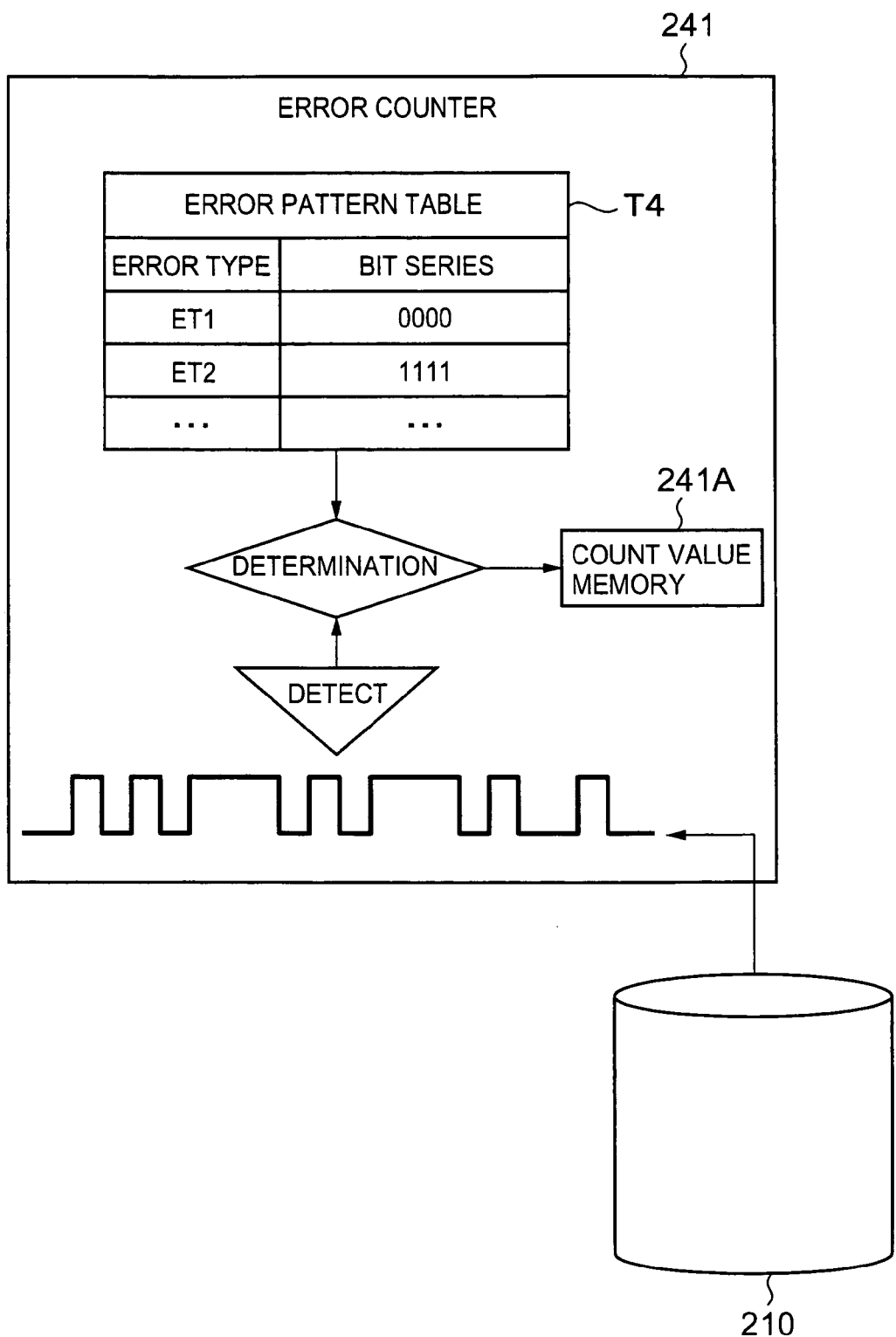
FIG. 9 is an explanatory figure showing an error detection method with an error counter.

FIG. 9 is an explanatory figure showing the error detection method with the error counter 241. This error counter 241 comprises an error pattern table T4 which is set up in advance. As such error patterns which are set up in advance, for example, there may be cited error patterns which are determined by the protocol. Or it is possible to set, as an error pattern, whether or not the address specified within a command and the address contained in the response from the disk drive 210 agree with one another.

The error counter 241 detects the pattern (the bit series) of the data input to and output from the disk drive 210, and, by collating this data pattern which has been detected and the error patterns, determines as to the presence or absence of an error. If an error has been detected, the error counter 241 increments a count value which is stored in a count value memory 241A.

Figure 10:
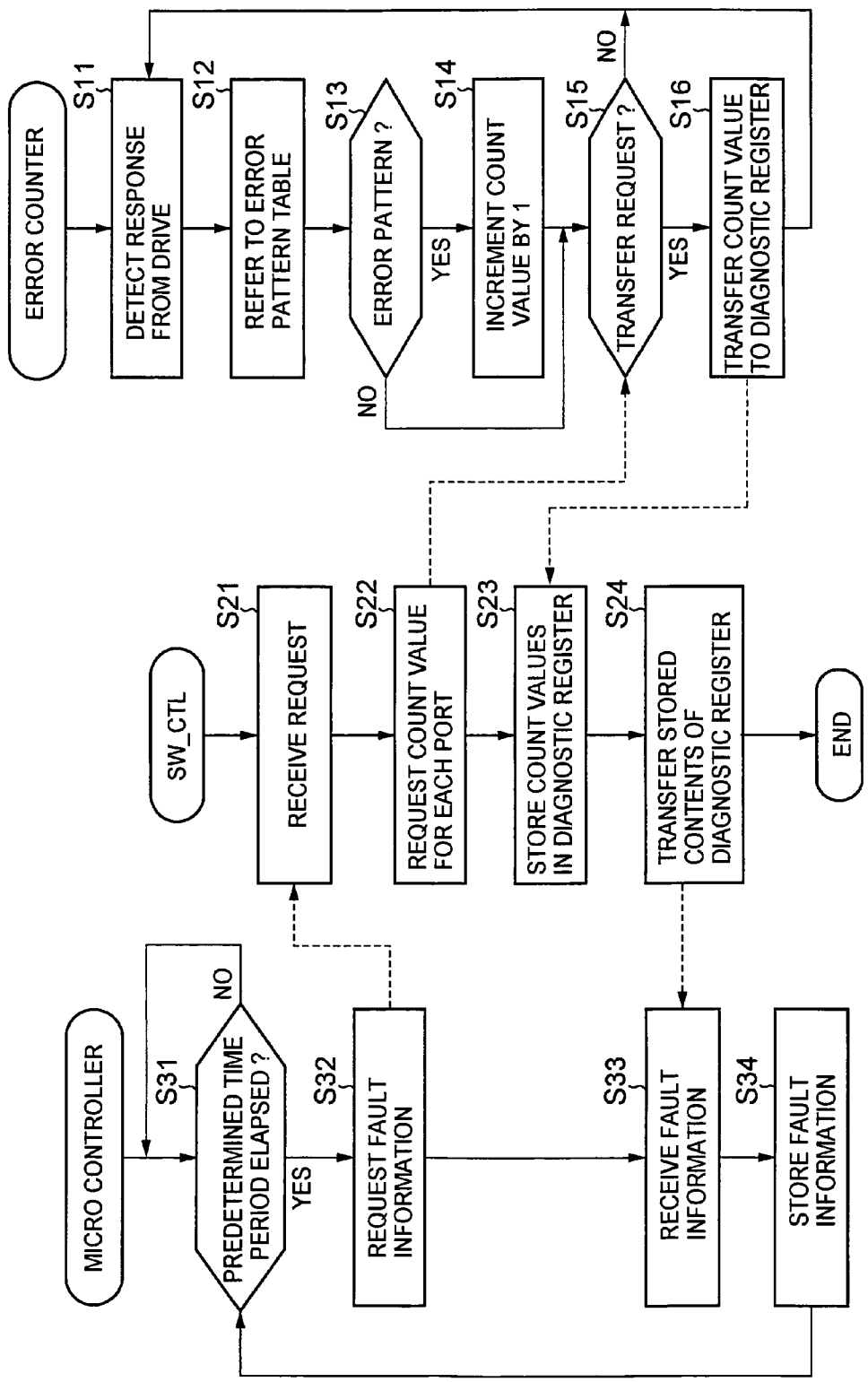
FIG. 10 is a flow chart showing the overall operation of the error detection method.

Next, FIG. 10 is a flow chart showing the overall operation of this error detection method and the fault information T3. As in the case of all the flow charts to be described hereinafter, this flow chart shows a summary of the corresponding processing, and in some cases the flow chart may differ from the actual program which is executed. Furthermore, each of the steps is prefixed by "S", and a brief account thereof is given.

First the operation of the error counter 241 will be explained. When this error counter 241 detects a response from the disk drive 210 (S11), by referring to the error pattern table T4 (S12), it determines whether or not the response of the disk drive 210 corresponds to these error patterns (S13). If no error pattern has been detected in the response from the disk drive 210 (S13: NO), then the flow of control skips the step S14 and proceeds to S15.

If an error pattern has been detected (S13: YES), then the error counter 241 increments its count value by 1 (S14). And the error counter 241 determines (S15) whether or not a transfer request from the switching control circuit 242 for the count value has taken place, and, if such a request for transfer has taken place (S15: YES), then it stores the count value in the diagnostic register 243 (S16). In this manner, the error counter 241 which is provided for each of the ports counts the number of errors which have occurred and stores that value, and transfers the count value to the diagnostic register 243 and stores it therein, only when a request for transfer has taken place.

The operation of the micro controller 232 and the switching control circuit 242 will now be explained. The micro controller 232 determines (S31) whether or not a predetermined time period which has been set to, for example, some number of seconds (about five seconds) has elapsed.

If this predetermined time period elapses (S31: YES), then the micro controller 232 requests (S32) the switching control circuit 242 to transmit its fault information (the count values for the ports). In other words, the micro controller 232 updates the fault information T3 in a predetermined cycle.

When the switching control circuit 242 receives the request from the micro controller 232 (S21), it requests the error counters 241 for each of the ports to transfer their count values (S22). The switching control circuit 242 receives these count values from the respective error counters 241 and stores them in the diagnostic register 243 (S23). And the switching control circuit 242 transmits the stored contents T2 of the diagnostic register 243 to the micro controller 232 (S24).

When the micro controller 232 receives the stored contents T2 of the diagnostic register 243 from the switching control circuit 242 (S33), it updates its fault information T3 (S34).

In this manner, each of the error counters 241 separately and individually counts the number of times an error has occurred, and the micro controller 232 collects these count values and updates the fault information T3 at a predetermined cycle. The updating of the count values and the updating of the fault information T3 are not synchronized.

Figure 11:
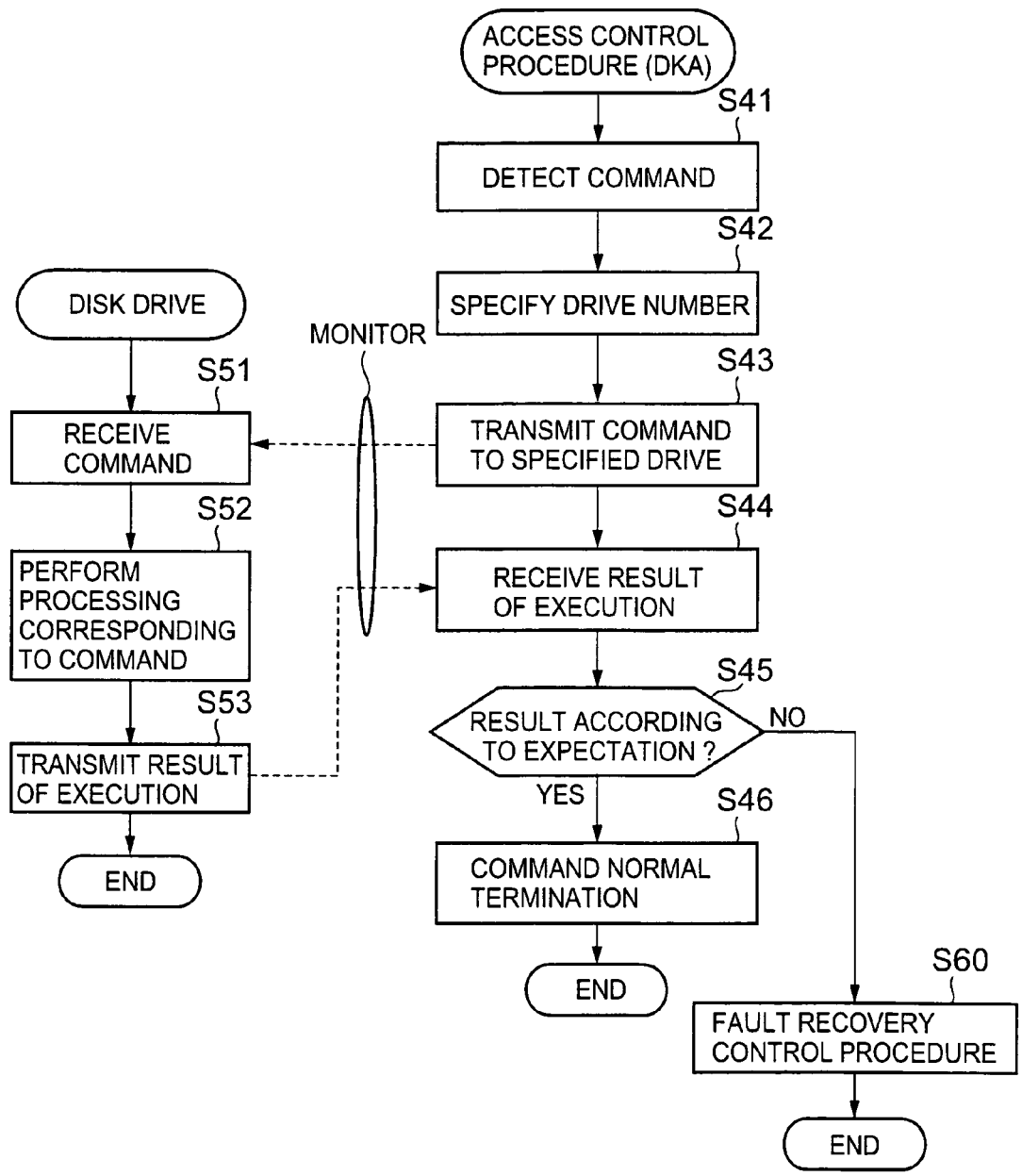
FIG. 11 is a flow chart showing an access control procedure.

FIG. 11 is a flow chart showing an access control procedure performed by the DKA 120. When the DKA 120 detects that a non-processed command has been stored in the common memory 140 (S41), it converts the logical address included in this command to a physical address, and specifies the number of the disk drive 210 which should be accessed (S42).

The DKA 120 transmits a command to the disk drive 210 which has the specified drive number (S43). As described above, each of the switching circuits 240 switches to connect together predetermined ports by collating the collating the drive number included in the command and the port management table T1.

When the disk drive 210 receives this command from the DKA 120 (S51), it executes a procedure corresponding to this command (S52). As a procedure corresponding to this command, for example, data may be read out from or written into the address specified by the command. And the disk drive 210 responds with the result of the execution of this procedure to the DKA 120 (S53). The response of the disk drive 210 is tested by the error counter 241.

The response of the disk drive 210 is received by the DKA 120 via the switching circuit 240 (S44). And the DKA 120 determines (S45) as to whether or not the response of the disk drive 210 is according to expectation. If a result according to expectation is indeed returned from the disk drive 210 (S45: YES), then the procedure terminates, since the command which was issued by the DKA 120 has been processed normally.

By contrast, if the response from the disk drive 210 is not a result according to expectation (S45: NO), then the DKA 120 determines that an access fault to the disk drive 210 has occurred, and executes its fault recovery control procedure (S60). For example, it may be determined that an access fault has occurred if the address in the command which was issued by the DKA 120 and the address included in the response from the disk drive 210 are different from one another, or if there is no response from the disk drive 210 even though a predetermined time period has elapsed, or the like.

Figure 12:
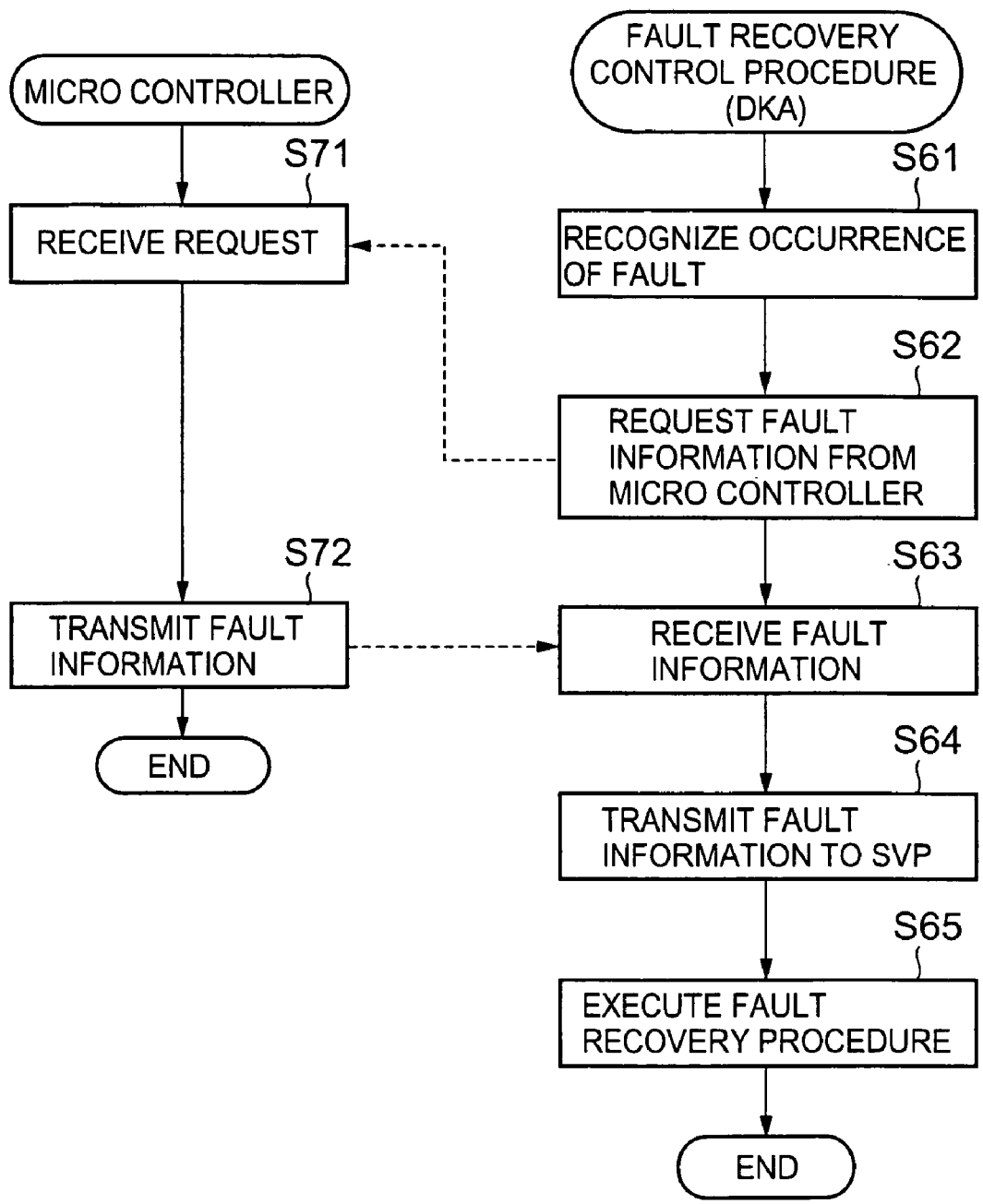
FIG. 12 is a flowchart showing a fault recovery control procedure.

FIG. 12 is a flow chart showing the fault recovery control procedure. When the DKA 120 recognizes that an access fault has occurred (S61), then it requests the micro controller 232 to transmit the fault information T3 (S62). When the micro controller 232 receives this request from the DKA 120 (S71), it transmits the fault information T3 to the DKA 120 (S72).

When the DKA 120 receives the fault information T3 from the micro controller 232 (S63), it transmits this fault information T3 to the SVP 160 (S64). When the SVP 160 receives this fault information T3, for example, it displays a warning message on the management terminal 30. And the DKA 120 executes a fault recovery procedure, based on the contents of the fault information T3 (S65).

Figure 13:
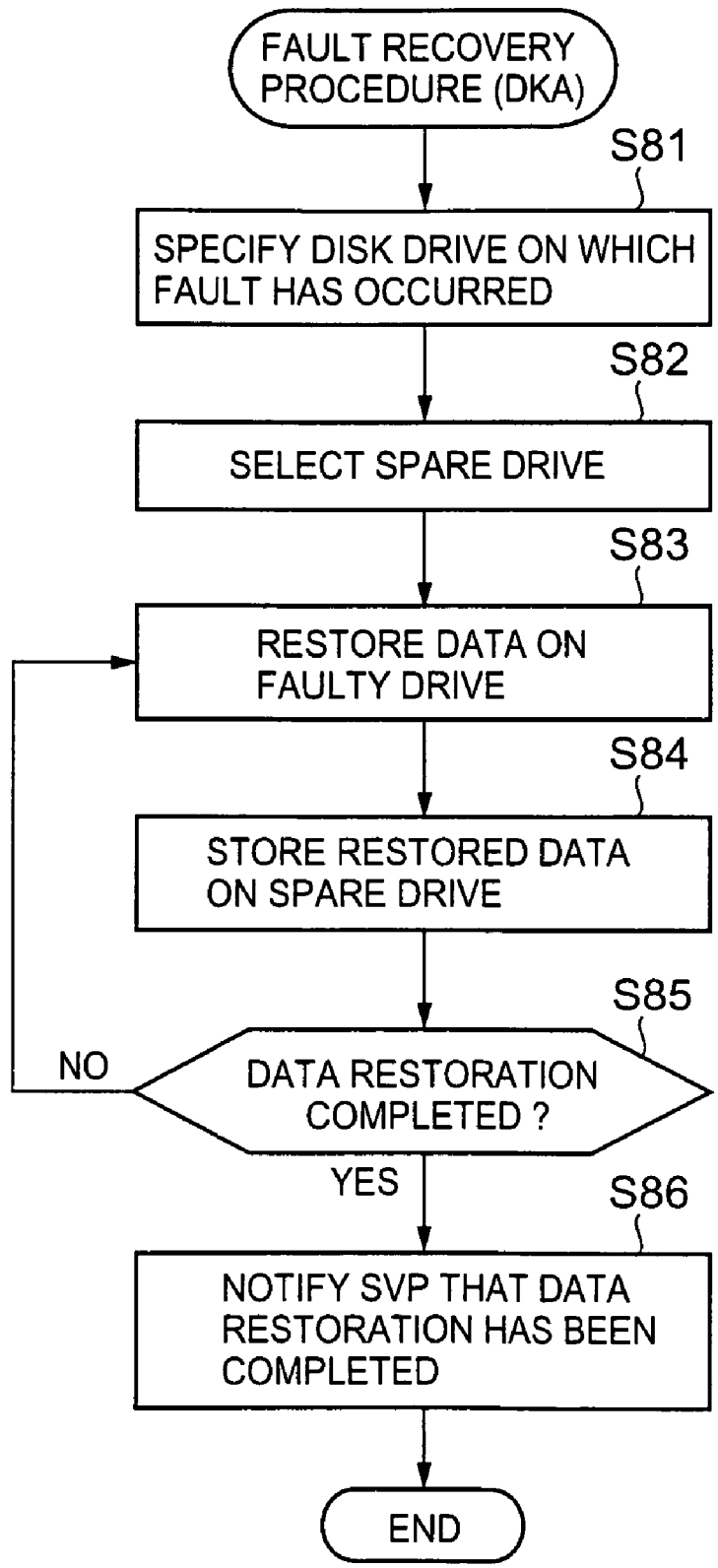
FIG. 13 is a flow chart showing a fault recovery procedure.

FIG. 13 is a flow chart showing this fault recovery procedure. The DKA 120 specifies the disk drive 210 on which the access fault has occurred, based on the fault information T3 (S81). The disk drive 210 on which the access fault has occurred can be immediately specified, since the count value for this error is also greatly increased as compared to the other disk drives 210.

The DKA 120 selects an unused spare drive from among the disk drives 210 which are provided in the storage unit 200 (S82). For example, if disk drives 210 of a plurality of types are mixed together in the storage unit 200, as in the case of, for example, SATA (Serial AT Attachment) disks or SCSI (Small Computer System Interface) disks or the like, then the DKA 120 selects a spare drive of the same type and the same capacity as that disk drive 210 on which the access fault has occurred.

And the DKA 120 reconstructs (S83) the data which is stored on that disk drive 210 on which the access fault has occurred (hereinafter also termed the faulty drive), and stores the reconstructed data on the spare drive (S84). And the DKA120 repeatedly performs the steps S83 and S84 until all of the data which is stored on the faulty drive is reconstructed (S85).

When the shifting of the data from the faulty drive to the spare drive is completed (S85: YES), then the DKA 120 notifies the SVP 160 to the effect that the restoration of data has been completed (S86).

When the SVP 160 receives this notification from the DKA 120, for example, it displays a predetermined exchange message on the management terminal 30. This exchange message includes the drive number of the disk drive 210 which should be exchanged, and the number of the spare drive onto which its data has been reconstructed. When the user or a service person checks this exchange message, he pulls out the faulty drive from the storage unit 200, and fits a spare drive in the position in which this faulty drive was fitted.

The method for data reconstruction varies according to the RAID level. For example, in the case of mirroring, the data which is stored on a normal disk drive 210 is copied to a spare drive. If the parity is calculated is in RAID5, the data stored on the faulty drive is reconstructed by performing a logical calculation, based on the parity and on other data.

Figure 14:
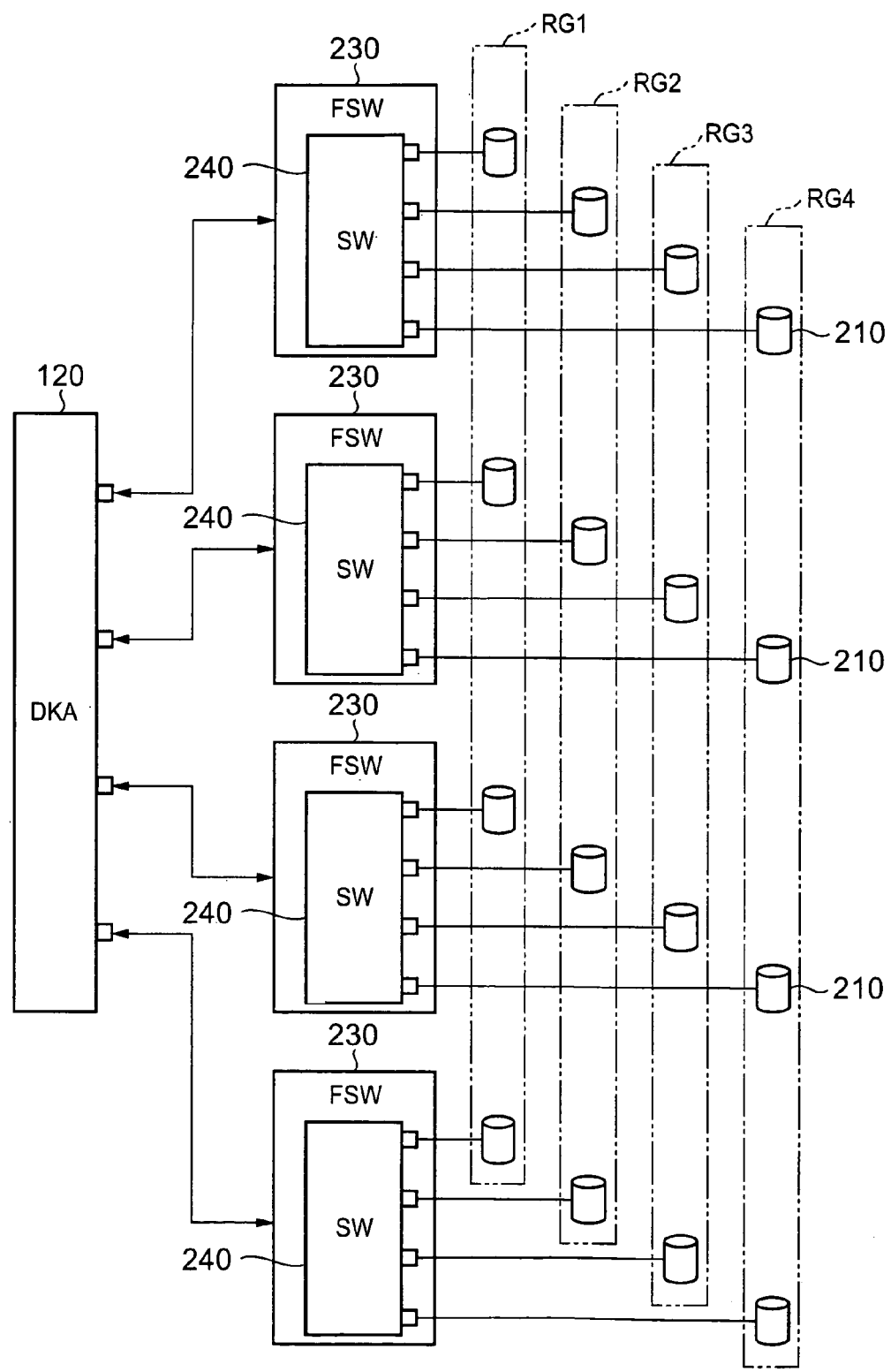
FIG. 14 is an explanatory figure showing a situation when RAID groups are made up using different FSWs.

FIG. 14 is an explanatory figure schematically showing an example of a method for structuring RAID groups, in this embodiment. For the convenience of explanation, in FIG. 14, one switching circuit 240 is shown in each of the FSWs 230.

As shown in FIG. 14, RAID groups RG1 through RG4 may be made up from disk drives 210 which are connected to different respective FSWs 230. By doing this, on whichever one of the FSWs 230 a fault may have occurred, based on the disk drives 210 of the same RAID group which are connected to different FSWs 230, it is possible to reconstruct the data on the disk drives 210 connected to this FSW 230 where the fault has occurred.

It should be understood that it would also be acceptable to make up a RAID group from a plurality of disk drives 210 which are connected to the same FSW 230.

By making this embodiment in the above described manner, the following beneficial effects are obtained. In this embodiment, along with connecting the disk drives 210 and the DKAs 120 one-to-one with the switching circuits 240, the structure is such that errors which have occurred on the disk drives 210 are monitored individually. Accordingly, on whichever of the disk drives 210 a fault may have occurred, it is possible immediately to specify this faulty drive, so that the convenience of use is enhanced.

In this embodiment, the counting of errors by the error counter 241, the storage of the count values by the micro controller 232, and the acquisition of the fault information T3 by the DKA 120 are all performed non-synchronously. In other words, even if the occurrence of an error has been detected by the error counter 241 or by the micro controller 232, the fault information T3 is not transferred from the micro controller 232 to the DKA 120, provided that the DKA 120 does not recognize an access fault. Accordingly it is possible for the storage control device 10 to continue its normal operation until the DKA 120 actually recognizes an access fault. Due to this, the execution of the fault recovery control procedure upon insignificant errors is prevented, and accordingly the convenience of use and the fault tolerance are enhanced.

In this embodiment the structure is such that, after having specified the faulty drive, the fault recovery control procedure is executed automatically. Accordingly it is possible to reconstruct and store the data which was stored on the faulty drive, even before a service person hurries to the spot where the storage control device 10 is located. Due to this, it is possible to shorten the time period until fault recovery, so that it is possible to enhance the reliability.

Embodiment 2

Figure 15:
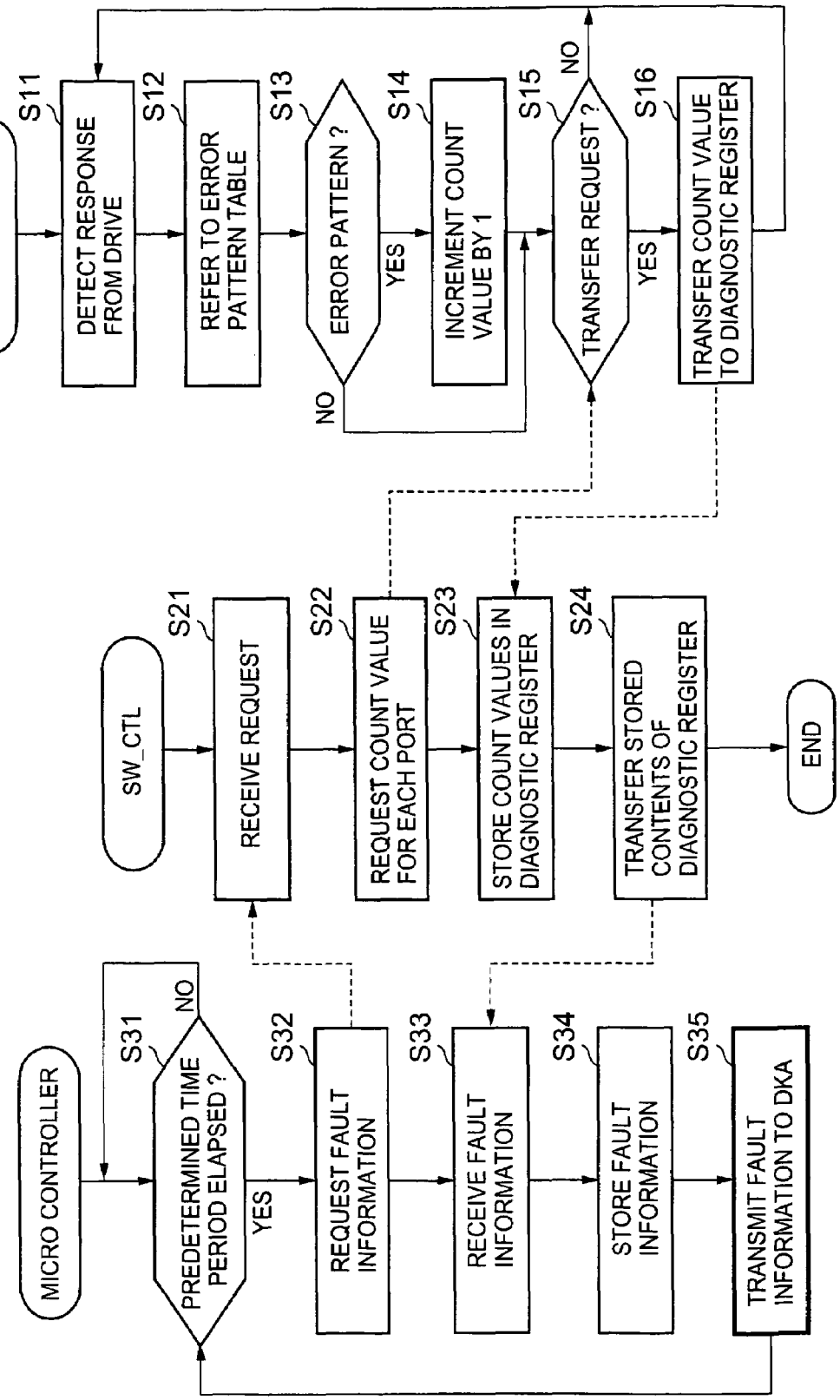
FIG. 15 is a flow chart showing the overall operation of an error detection method according to a second preferred embodiment of the present invention.

A second preferred embodiment of the present invention will now be explained with reference to FIG. 15. In this embodiment, the presence or absence of the occurrence of a fault is notified to the DKA 120 at the time point that the micro controller 232 updates the fault information T3. All of the following embodiments, including this second embodiment, may be considered as variations of the first embodiment, and have a common general structure. Thus, the explanation will focus on the portions which differ from the first embodiment.

When the micro controller 232 receives the count values for each port which have been stored in the diagnostic register 243 of the switching control circuit 242 (S33), it updates and stores the fault information T3 (S34), and furthermore transmits this fault information T3 to the DKA 120 (S35). In other words, in this embodiment, the fault information T3 is transmitted from the micro controller 232 to the DKA 120 even before the DKA 120 recognizes an access fault.

With this second embodiment having this type of structure, before the DKA 120 encounters an access fault, it is possible to detect whether or not a fault has occurred on a disk drive 210, so that it is possible to start the fault recovery control at an early stage.

Embodiment 3

Figure 16:
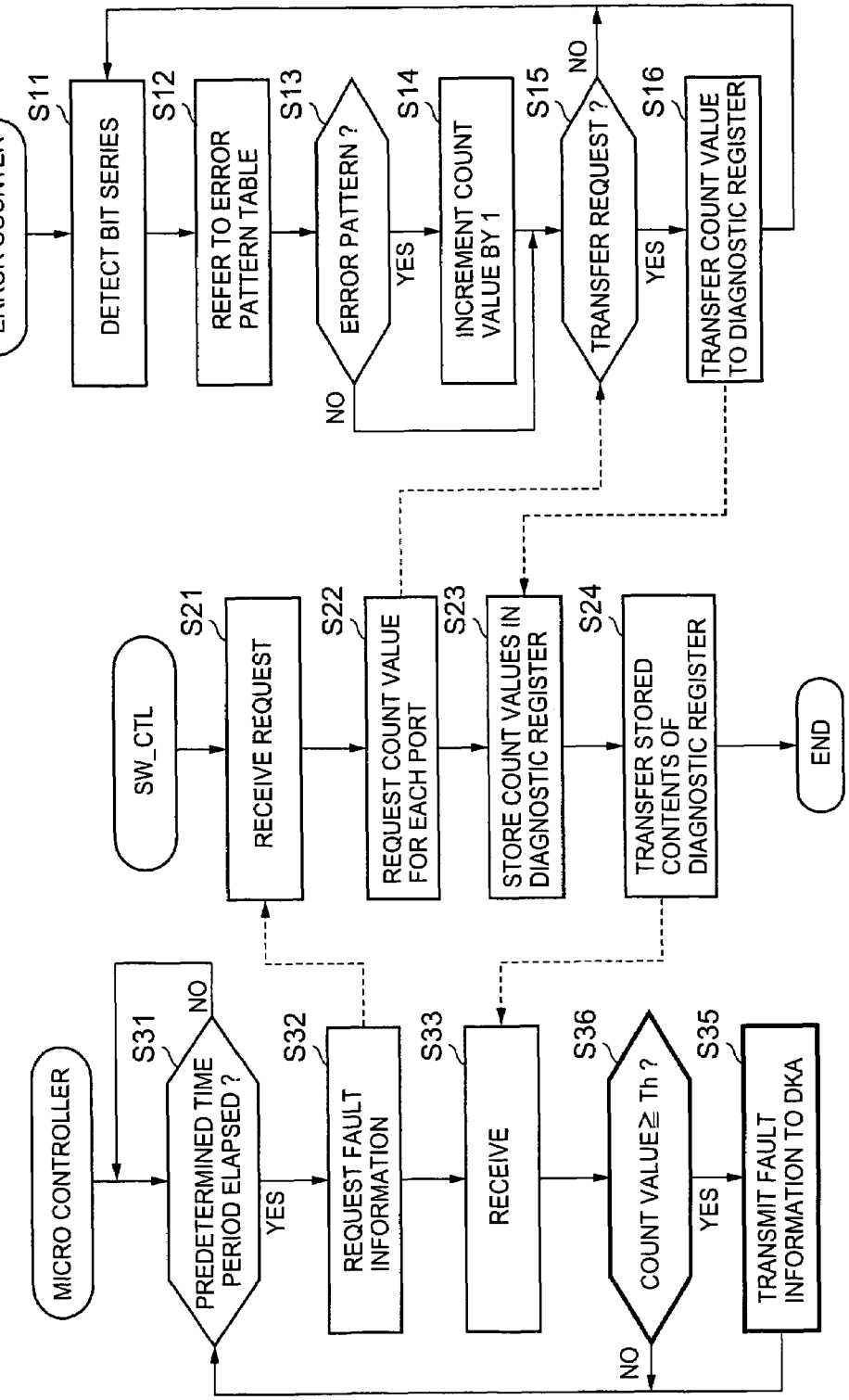
FIG. 16 is a flow chart showing the overall operation of an error detection method according to a third preferred embodiment of the present invention.

A third preferred embodiment of the present invention will now be explained with reference to FIG. 16. In this embodiment, the fault information T3 is transmitted from the micro controller 232 to the DKA 120, when the number of errors which has occurred at each of the ports (the count value) arrives at a predetermined value Th which is set in advance.

In detail, when the micro controller 232 receives the stored contents of the diagnostic register 243 (S33), it determines as to whether or not there exists a port at which the count value has arrived at the predetermined value Th (S36). If the micro controller 232 has found a port at which the count value is greater than or equal to the predetermined value Th (S36: YES), then it transmits the fault information T3 to the DKA 120 (S35).

With this third embodiment having this type of structure, if an insignificant error has occurred accidentally, it is possible to suppress the transmission of the fault information T3 from the micro controller 232 to the DKA 120, so that it is possible to stop the DKA 120 performing fault recovery control uselessly.

Embodiment 4

A fourth preferred embodiment of the present invention will now be explained with reference to FIGS. 17 through 19. In this embodiment, the operational state of a disk drive 210 which is not connected to the DKA 120 is checked by supplying a pattern for testing to this disk drive 210.

Figure 17:
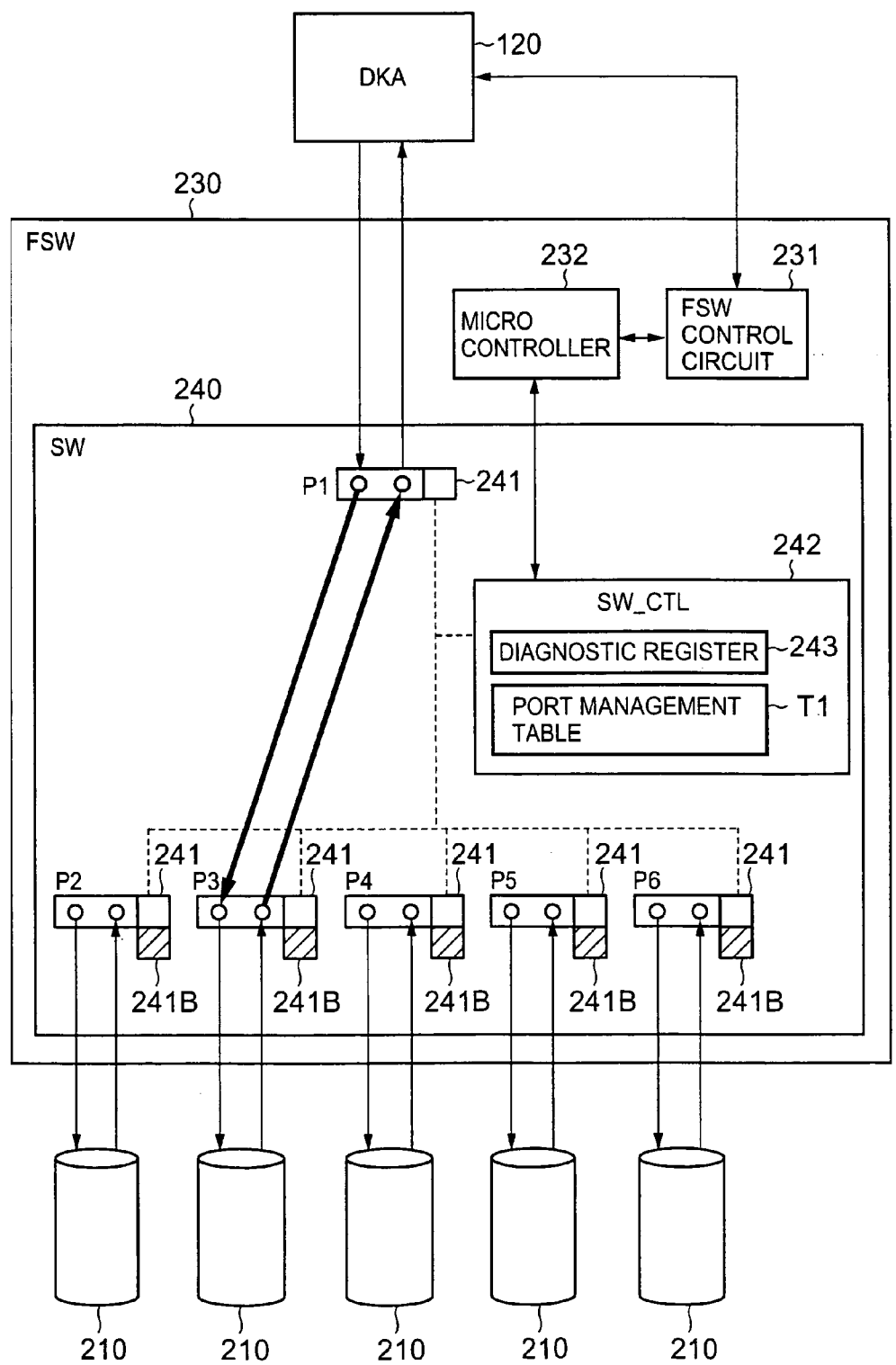
FIG. 17 is an explanatory figure showing the overall operation of an error detection method according to a fourth preferred embodiment of the present invention.
Figure 18:
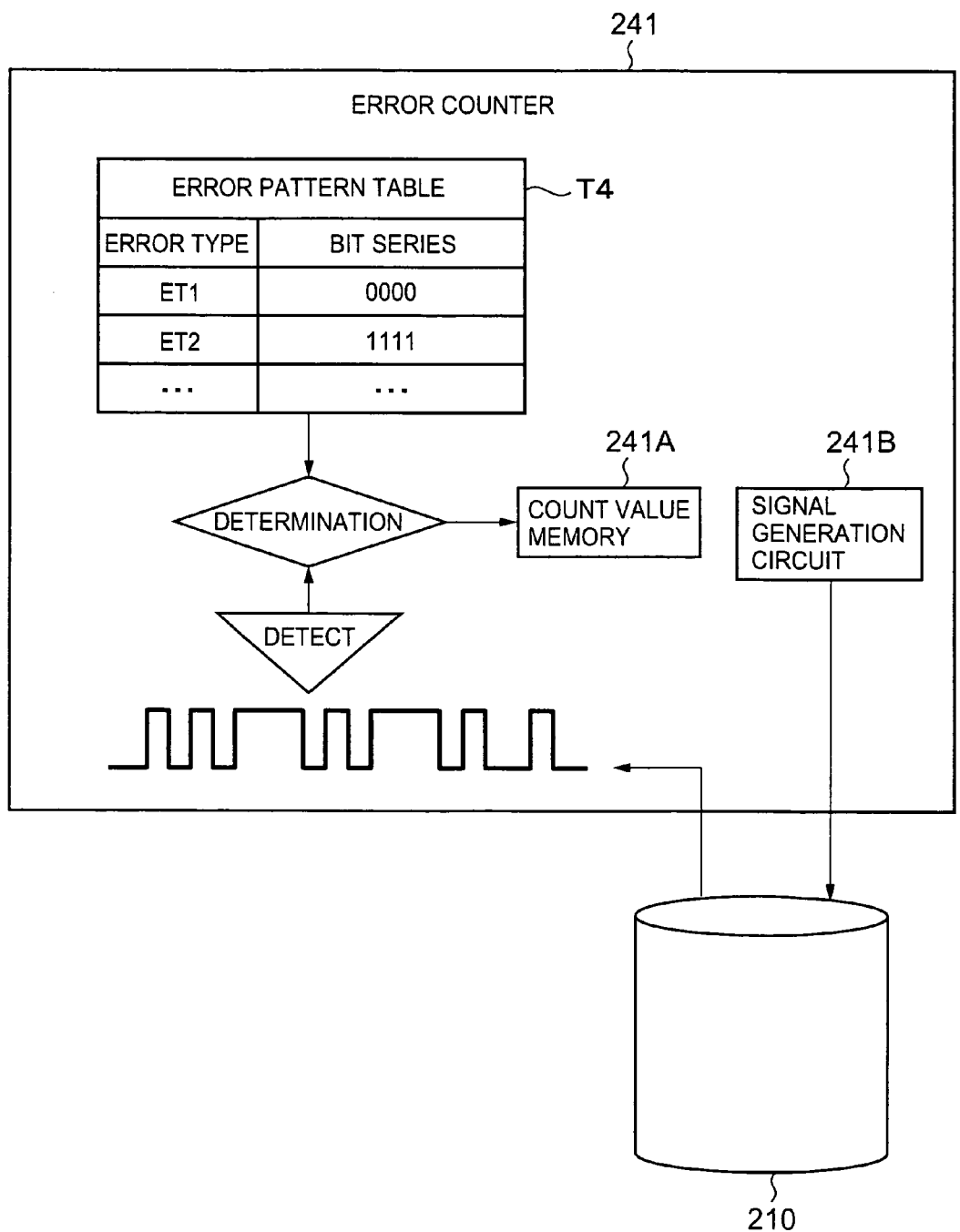
FIG. 18 is an explanatory figure showing an error detection method with an error counter.

As shown in the schematic figure of FIG. 17, signal generation circuits 241B for generating patterns for testing are provided to each of the error counters 241. As shown in the schematic illustration of an error counter 241 in FIG. 18, each of these signal generation circuits 241B supplies a predetermined pattern for testing (a bit series) to its disk drive 210. And the error counter 241 detects the response signal of the disk drive 210 to this pattern for testing, and determines as to whether not this response corresponds to an error pattern.

Figure 19:
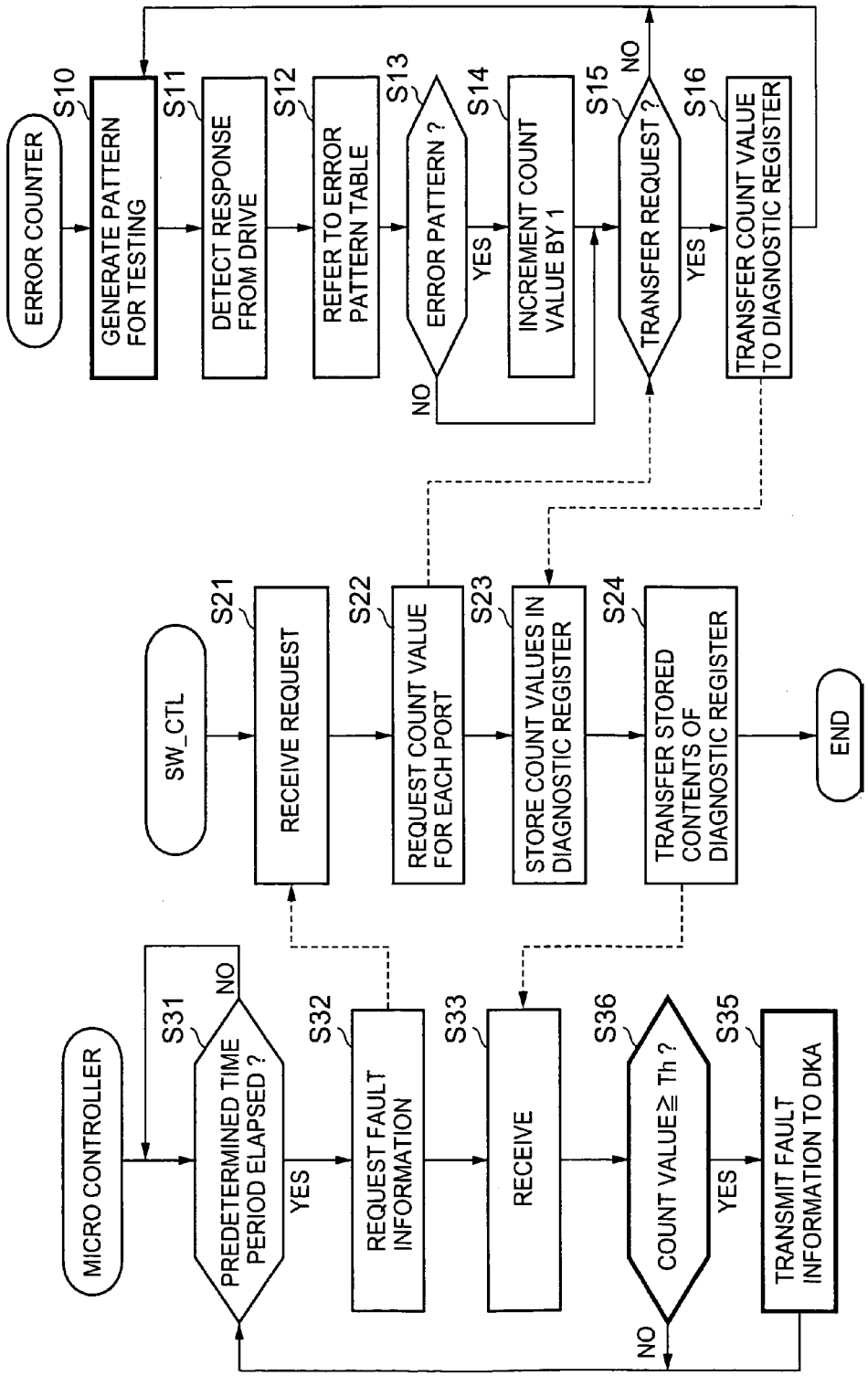
FIG. 19 is a flow chart showing the overall operation of this error detection method.

The flow chart of FIG. 19 will now be referred to. First, the error counter 241 inputs (S10) the pattern for testing to a disk drive 210 which is not connected to the DKA 120. And the error counter 241 detects (S11) the response of the disk drive 210 to this pattern for testing, and tests whether or not (S12, S13) it corresponds to an error pattern.

In this manner, in this embodiment, the presence or absence of errors is tested by supplying a pattern for testing to a disk drive 210 which is not switched to be connected to the DKA 120. Accordingly, it is also possible to test disk drives which are not being used by the DKA 120 for the presence or absence of errors, so that it is possible to enhance the accuracy of fault detection.

Embodiment 5

Figure 20:
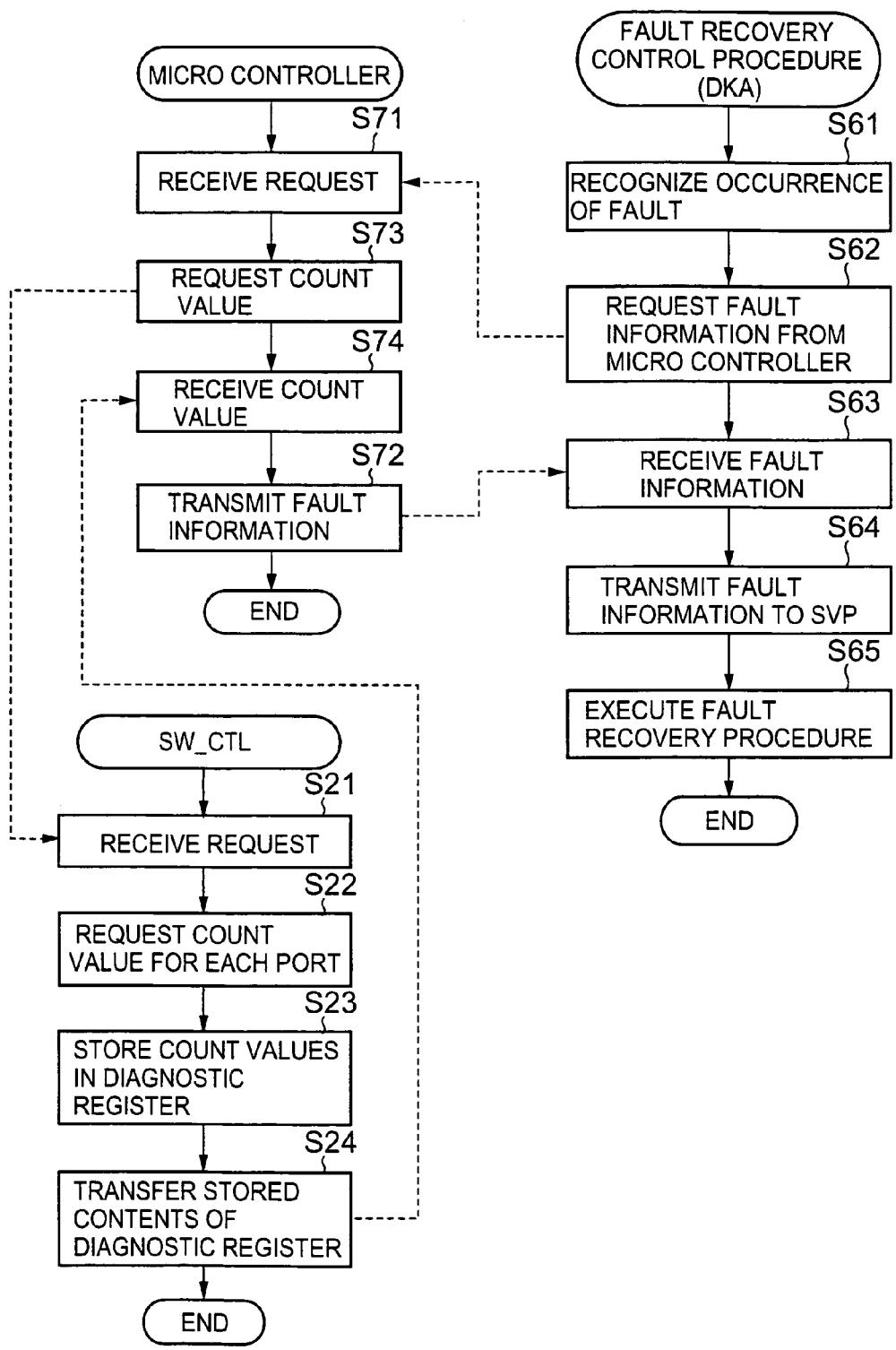
FIG. 20 is a flow chart showing the overall operation of an error detection method according to a fifth preferred embodiment of the present invention.

A fifth preferred embodiment of the present invention will now be explained with reference to FIG. 20. In this embodiment, the micro controller 232 is arranged only to acquire the stored contents of the diagnostic register 243 and to generate the fault information T3, if a request has been made by the DKA 120.

When the DKA 120 recognizes the occurrence of an access fault (S61), it requests the micro controller 232 to transmit the fault information (S62). Upon receipt of this request (S71), the micro controller 232 requests the switching control circuit 242 to transfer the stored contents of the diagnostic register 243 (S73).

When the switching control circuit 242 receives this request from the micro controller 232 (S21), it reads out the respective count values from the error counters 241 (S22), and stores them in the diagnostic register 243 (S23). And the switching control circuit 242 transmits the stored contents of the diagnostic register 243 to the micro controller 232 (S24). And, when the micro controller 232 receives the stored contents of the diagnostic register 243 (S74), it generates the fault information T3 and transmits it to the DKA 12 (S72).

With this fifth embodiment having this type of structure, the micro controller 232 generates the fault information T3 synchronously with the recognition of an access fault by the DKA 120. Accordingly, it is possible to reduce the load on the micro controller 232, as compared with the case in which the fault information T3 is updated at a predetermined cycle.

Embodiment 6

Figure 21:
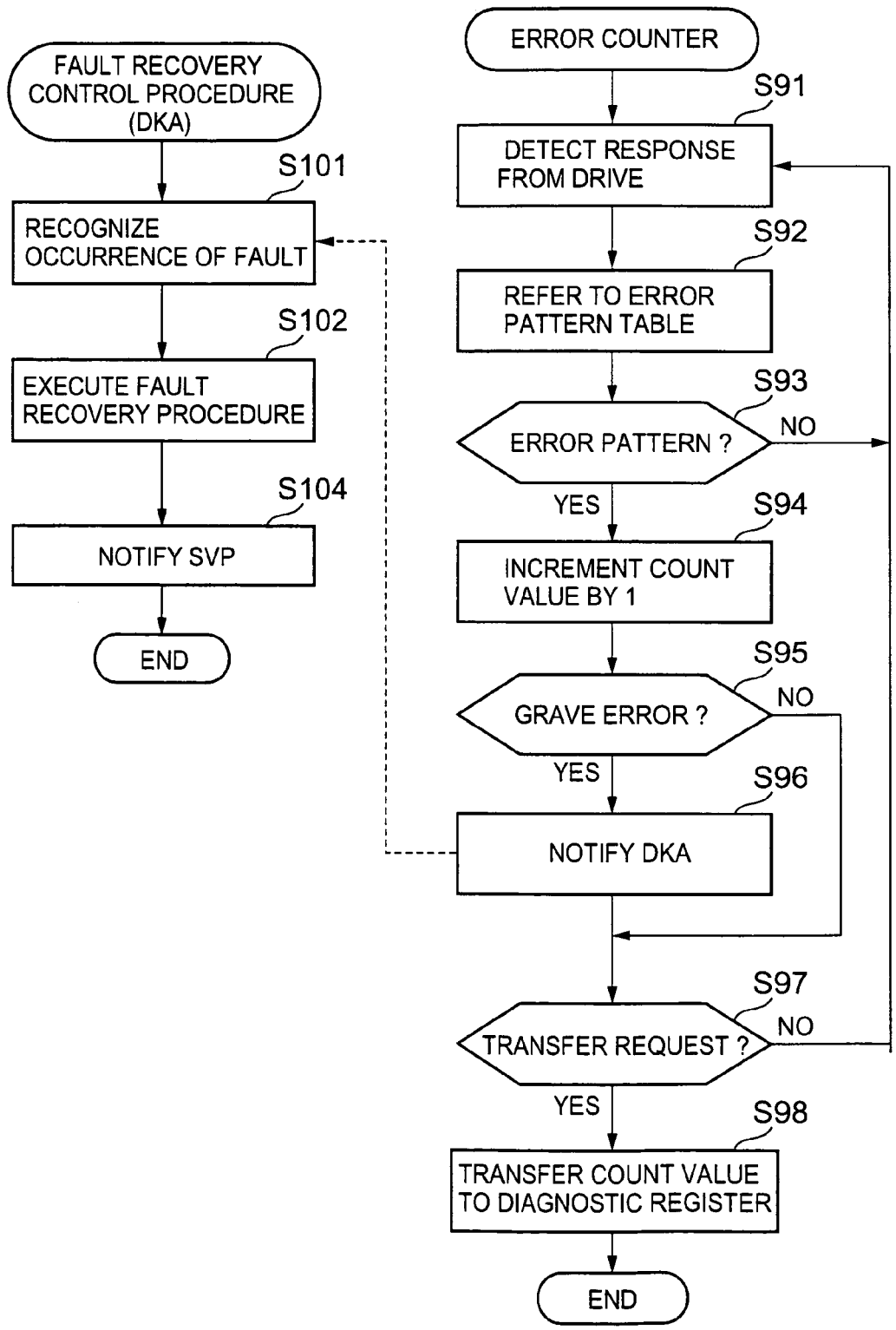
FIG. 21 is a flow chart showing the overall operation of an error detection method according to a sixth preferred embodiment of the present invention.

A sixth preferred embodiment of the present invention will now be explained with reference to the flow chart of FIG. 21. In this embodiment, if the error counter 241 has detected a grave error which is specified in advance, then the occurrence of this error is immediately notified from the error counter 241 to the DKA 120.

When the error counter 241 detects a response from its disk drive 210 (S91), it refers to the error pattern table T4 (S92), and determines as to whether or not an error pattern is included in this response (S93).

If an error pattern has been detected (S93: YES), then the error counter 241 increments its count value (S94). Furthermore, the error counter 241 determines as to whether or not this error which has been detected is a predetermined grave error which has been specified in advance (S95). If it is a grave error (S95: YES), then the error counter 241 notifies the fact that a grave error has been detected to the DKA 120 via the micro controller 232 or the like (S96).

If there is no grave error (S95: NO), then it is determined as to whether or not a transfer has been requested by the switching control circuit 242 (S97), and if there has been a transfer request (S97: YES), then the count value is transferred to the diagnostic register 243 and is stored therein (S98).

The DKA 120 recognizes the occurrence of a fault based on the error notification from the error counter 241 (S101), and executes its fault recovery procedure (S102). Furthermore, the DKA 120 notifies the SVP 160 of the fact that a fault has been detected and of the fact that the fault recovery procedure has been started (S103).

It should be understood that a structure would also be acceptable in which, first, it is determined whether there is a grave error or not (S95), and, if there is a grave error, the count value is increased by a number which is set in advance. And a structure would also be acceptable in which, if the count value has become greater than or equal to a predetermined threshold value, then the occurrence of an error is notified to the DKA 120. Furthermore, a structure would also be acceptable in which the decision as to whether or not there is a grave error is performed within the micro controller 232.

With this sixth embodiment having this type of structure, it is possible to perform the fault recovery procedure before an access fault has been detected by the DKA 120, since the DKA 120 is immediately notified if a grave error has been detected by the error counter 241.

Embodiment 7

Figure 22:
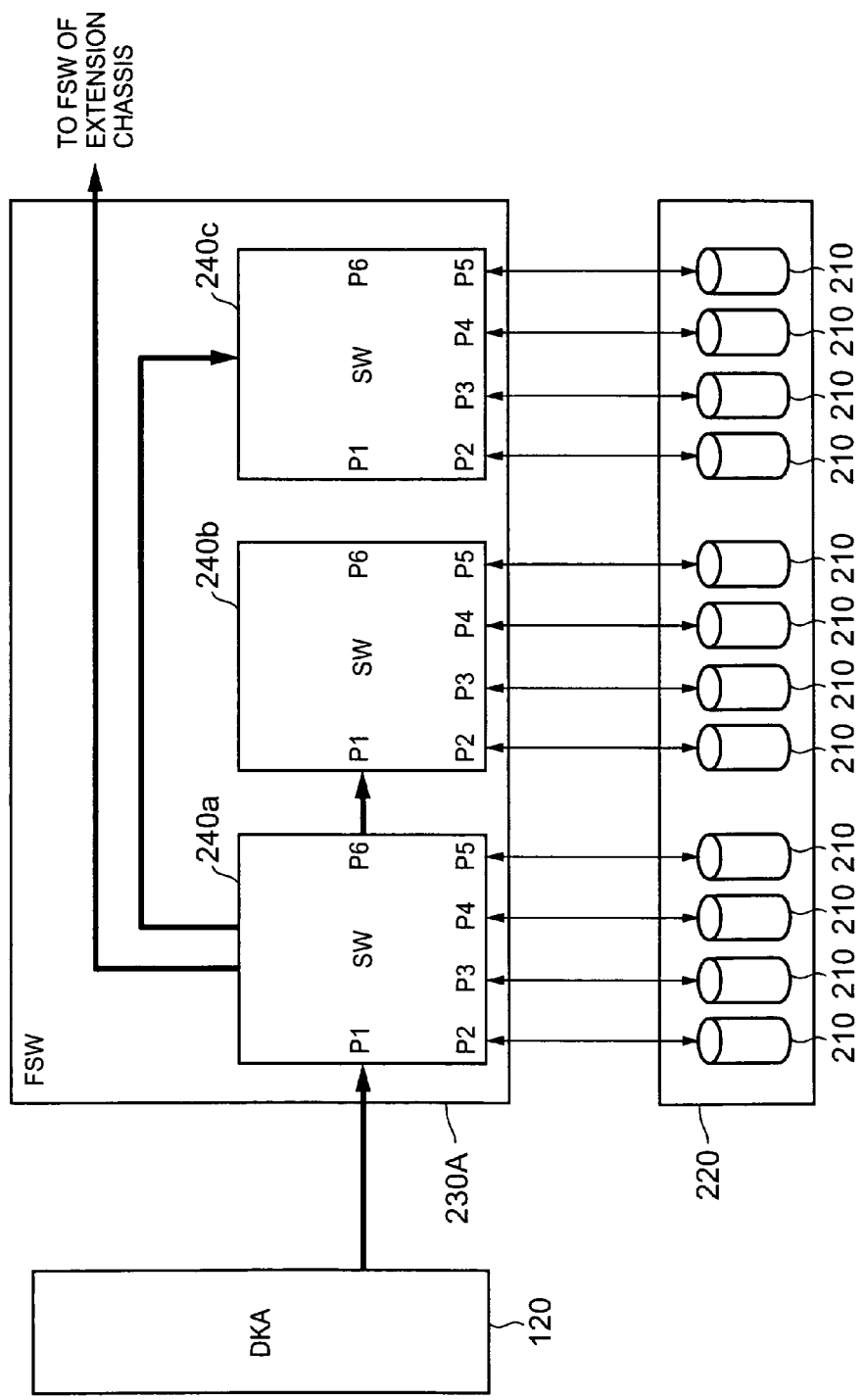
FIG. 22 is an explanatory figure showing a state of connection of switching circuits according to a seventh preferred embodiment of the present invention.

A seventh preferred embodiment of the present invention will now be explained with reference to FIG. 22. In this embodiment, the switching circuits 240 are connected together in a star topology. As shown in the schematic figure of FIG. 22, in this embodiment, the first switching circuit 240a is taken as a center, and each of the other switching circuits 240b and 240c is connected to this switching circuit 240a.

Embodiment 8

Figure 23:
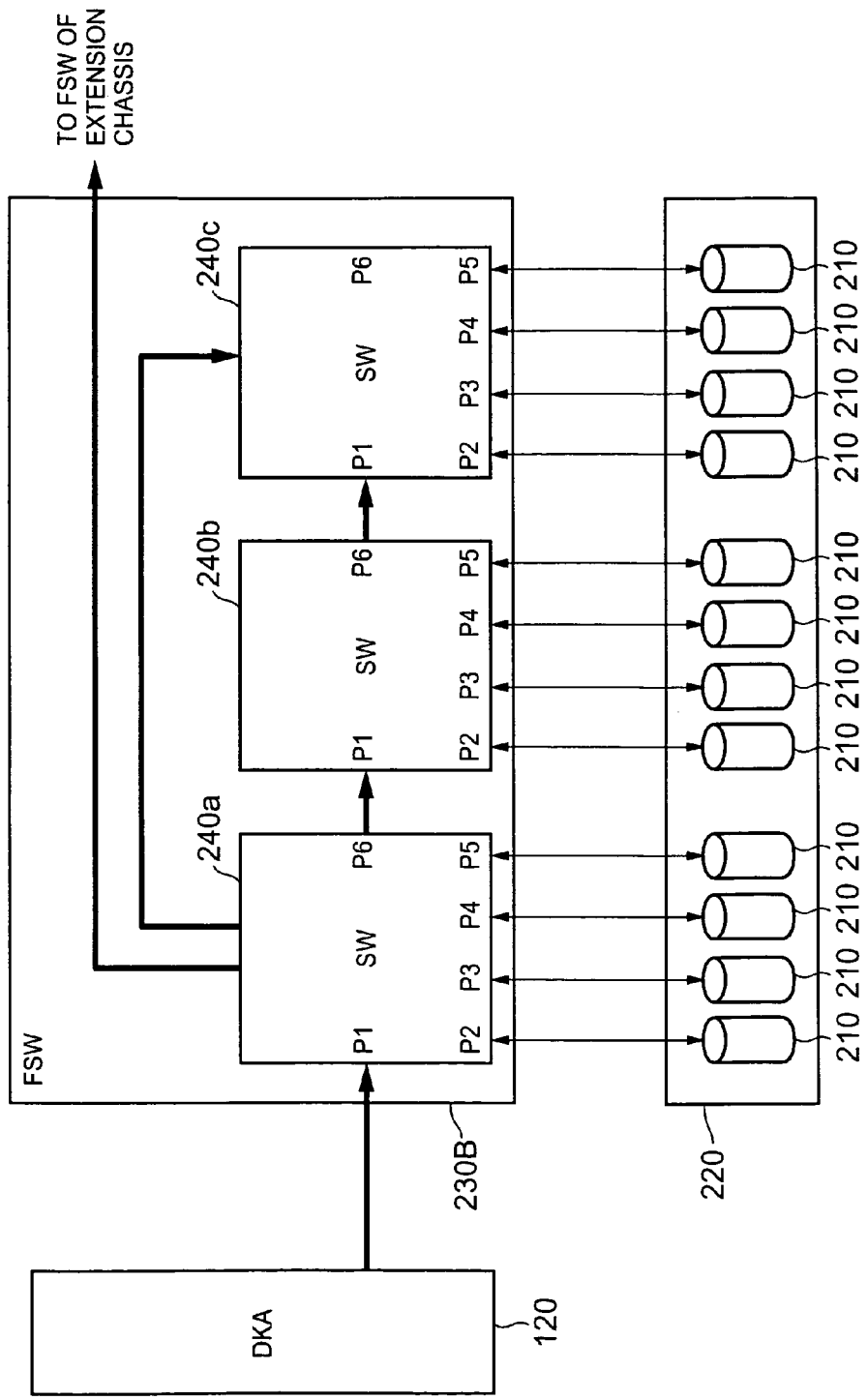
FIG. 23 is an explanatory figure showing a state of connection of switching circuits according to an eighth preferred embodiment of the present invention.

An eighth preferred embodiment of the present invention will now be explained with reference to FIG. 23. In this embodiment, the switching circuits 240 are connected together in a loop type topology. As shown in the schematic figure of FIG. 23, in this embodiment, the second switching circuit 240b is connected to the first switching circuit 240a, the third switching circuit 240c is connected to the second switching circuit 240b, and the first switching circuit 240a and the third switching circuit 240c are connected together.

By connecting the switching circuits 240 in a loop manner like this, and in particular when four or more of the switching circuits 240 are thus connected, on whichever one of the switching circuits 240 a fault may have occurred, it is possible to utilize a different one of the switching circuits 240, so that the convenience of use is enhanced by a further level.

It should be understood that the present invention is not limited to the embodiments described above. Various additions and changes and the like may be made by a person of skill in the relevant art to the present invention, without departing from its scope.

What is claimed is:

1. A storage control device, comprising:
 a host communication control unit which controls communication with a host device;
 a subordinate communication control unit which controls communication with a plurality of storage devices configured into a plurality of RAID groups for storing data and parity; and
 a plurality of connection control units each of which connects a different set of said storage devices and said subordinate communication control unit, each set of said storage devices containing one and only one storage device of each of the RAID groups;

wherein said each connection control unit comprises a plurality of switching circuits which are connected to said different set of said storage devices via a plurality of communication ports, a control circuit which is connected to each of said switching circuits, and an error monitoring unit which monitors error information for each of said storage devices, said plurality of switching circuits in said each connection control unit are connected to one another either in series, or with one said plurality of switching circuits as a central hub having the remaining switching circuits connected thereto, or in a ring shape, said error monitoring unit comprises:

error information collection units, provided within said switching circuits respectively, which detect errors respectively occurring at said communication ports of said switching circuits, and store the errors as error information;

an intermediate storage unit, provided within said control circuit, which reads out and stores said error information stored in said error information collection units at respective predetermined timings; and an error information transmission unit, provided within said control circuit, which transmits said error information stored in said intermediate storage unit to said subordinate communication control unit in response to a request from said subordinate communication control unit, when detecting a predetermined type of error which is set as highly urgent, said error monitoring circuit notifies the subordinate communication control unit that the predetermined type of error is detected, and when detecting an error other than the predetermined type of error, the error information collection unit stores the detected error as error information and transmits the error information according to the request from the subordinate communication control unit.

2. The storage control device according to claim 1, wherein said error monitoring unit transmits said error information to said subordinate communication control unit, if a request has been received from said subordinate communication control unit.

3. The storage control device according to claim 1, wherein said subordinate communication control unit detects, based on the result of communication with said storage device, whether or not an error has occurred, and, if an error is detected, requests said error monitoring unit to transmit said error information.

4. The storage control device according to claim 1, wherein said subordinate communication control unit specifies a storage device on which a fault has occurred based on said error information acquired from said error monitoring unit, and executes a fault recovery procedure for recovering data stored on said storage device on which said fault has occurred.

5. The storage control device according to claim 1, wherein each of said error information collection units comprises error counters, provided to the respective communication ports, and a register which stores the count values of said respective error counters as said error information; and each of said error counters increments said count value, if a bit pattern of data flowing through the communication port agrees with a predetermined error pattern which is set in advance.

6. The storage control device according to claim 5, wherein said intermediate storage unit requests said error information collection units to acquire said error information at a predetermined cycle which is set in advance; and said error information collection units, in response to said requests from said intermediate storage unit, transfer the count values of said error counters to said register, and transfer said count values stored in said register to said intermediate storage unit.

7. The storage control device according to claim 1, wherein said connection control unit connects a communication port which is directly or indirectly connected to said subordinate communication control unit, to one of other communication ports which are respectively connected to said storage devices.

8. The storage control device according to claim 1, wherein each of said switching circuits comprises a port management table indicating a correspondence relationship between said storage devices and said communication ports, and uses this port management table for switchingly connecting together said subordinate communication control unit and a specified communication port among said communication ports.

9. The storage control device according to claim 1, wherein said error monitoring unit comprises a signal generator which generates a predetermined pattern for testing set in advance, supplies said pattern for testing to a storage device among said storage devices which is not connected to said subordinate communication control unit, and detects said error based on a response signal from said storage device to said pattern for testing.

10. The storage control device according to claim 1, if an error other than the predetermined type of error is detected, a closing down procedure or a fault recovery procedure for a storage device at fault is suppressed.

11. An error information management method for a storage control device which comprises: a host communication control unit which controls communication with a host device, a subordinate communication control unit which controls communication with a plurality of storage devices, and a plurality of connection control units each of which includes a plurality of switching circuits, a control circuit which is connected to each of said switching circuits, and an error monitoring unit, said method comprising:

configuring the plurality of storage devices into a plurality of RAID groups for storing data and parity;

connecting each of connection control units with a different set of said storage devices and said subordinate communication control unit, each set of said storage devices containing one and only one storage device of each of the RAID groups;

connecting the switching circuits in said each connection control unit to said different set of said storage devices via a plurality of communication ports;

connecting said plurality of switching circuits in said each connection control unit to one another either in series, or with one said plurality of switching circuits as a central hub having the remaining switching circuits connected thereto, or in a ring shape;

determining whether or not bit patterns which have appeared at the communication ports respectively connected to said storage devices agree with a predetermined error pattern which is set in advance;

increasing, if a bit pattern agreeing with said error pattern has appeared at one of said communication ports, a count value of an error counter of that communication port;

determining whether or not a predetermined time period has elapsed;

acquiring and storing the respective count values of said error counters if said predetermined time period has elapsed;

determining whether or not an access error to any one of said storage devices from said subordinate communication control unit has been detected;

acquiring said respective stored count values if said access error has been detected;

specifying the storage device on which the fault has occurred based on said count values which have been acquired;

when detecting the access error as a predetermined type of error which is set as highly urgent, notifying the subordinate communication control unit that the predetermined type of error is detected, and when detecting the access error as an error other than the predetermined type of error, storing the detected error as error information and transmitting the error information according to a request from the subordinate communication control unit.

12. The error information management method for a storage control device according to claim 11, further comprising a step of transmitting information relating to said specified storage device to an external management terminal.

13. The error information management method for a storage control device according to claim 12, further comprising a step of recovering data stored on said specified storage device.

14. The error information management method for a storage control device according to claim 13, wherein said step of recovering said data comprises the steps of:

selecting an unused storage device among said storage devices;

reconstructing the data stored on said specified storage device based on data stored on another storage device which makes up a RAID group with said specified storage device; and storing said reconstructed data on said unused storage device which has been selected.

15. The method according to claim 11, further comprising a step of: if an error other than the predetermined type of error is detected, suppressing a closing down procedure or a fault recovery procedure for a storage device at fault.

16. A storage control device, comprising:

a host communication control unit which controls communication with a host device;

a subordinate communication control unit which controls communication with a plurality of storage devices configured into a plurality of RAID groups for storing data and parity; and a plurality of connection control unit each of which connects a different set of said storage devices and said subordinate communication control unit, each set of said storage devices containing one and only one storage device of each of the RAID groups;

wherein said each connection control unit comprises a plurality of switching circuits which are connected to said different set of said storage devices via a plurality of communication ports, a control circuit which is connected to each of said switching circuits, and an error monitoring unit which monitors error information for each of said storage devices, said plurality of switching circuits in said each connection control unit are connected to one another either in series, or with one said plurality of switching circuits as a central hub having the remaining switching circuits connected thereto, or in a ring shape, said error monitoring circuit comprises:

error information collection circuits, provided within each of said switching circuits respectively, which detect errors respectively occurring in said storage devices respectively connected to said communication ports of said switching circuits, and store the errors as error information;

an intermediate storage circuit, provided within said control circuit, which reads out and stores said error information stored in said error information collection circuits at respective predetermined timings; and an error information transmission circuit, provided within said control circuit, which transmits said error information stored in said intermediate storage circuit to said subordinate communication control unit in response to a request from said subordinate communication control unit, wherein when detecting a predetermined type of error which is set as highly urgent, said error monitoring circuit notifies the subordinate communication control unit that the predetermined type of error is detected, and when detecting an error other than the predetermined type of error, the error information collection unit stores the detected error as error information and transmits the error information according to the request from the subordinate communication control unit, wherein each of said error information collection circuits comprises error counters, provided to the respective communication ports, which count and store the number of said errors, and a register which stores the count values stored in said respective error counters as said error information; and each of said error counters increments said count value, if the bit pattern of data flowing through the communication port agrees with a predetermined error pattern which is set in advance.

17. The storage control device according to claim 16, if an error other than the predetermined type of error is detected, a closing down procedure or a fault recovery procedure for a storage device at fault is suppressed.

* * * * *

UNITED STATES PATENT AND TRADEMARK OFFICE
CERTIFICATE OF CORRECTION

| | | |
|---|---|---|
| PATENT NO. | : 7,571,356 B2 | Page 1 of 1 |
| APPLICATION NO. | : 11/334629 | |
| DATED | : August 4, 2009 | |
| INVENTOR(S) | : Inoue et al. | |

It is certified that error appears in the above-identified patent and that said Letters Patent is hereby corrected as shown below:

On the Title Pg., Under Item (75) please change the spelling of the third inventor's last name from --Matsuhige-- to "Matsushige"

Signed and Sealed this

Twenty-ninth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,571,356 B2  Page 1 of 1
APPLICATION NO. : 11/334629
DATED : August 4, 2009
INVENTOR(S) : Inoue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this

Seventh Day of September, 2010

David J. Kappos
*Director of the United States Patent and Trademark Office*